July 7, 1942.   C. A. NERACHER ET AL   2,288,594
POWER TRANSMISSION
Filed May 1, 1939   6 Sheets-Sheet 1

INVENTORS.
Carl A. Neracher,
BY William T. Dunn.
Harness, Lind, Pate & Harris
ATTORNEYS.

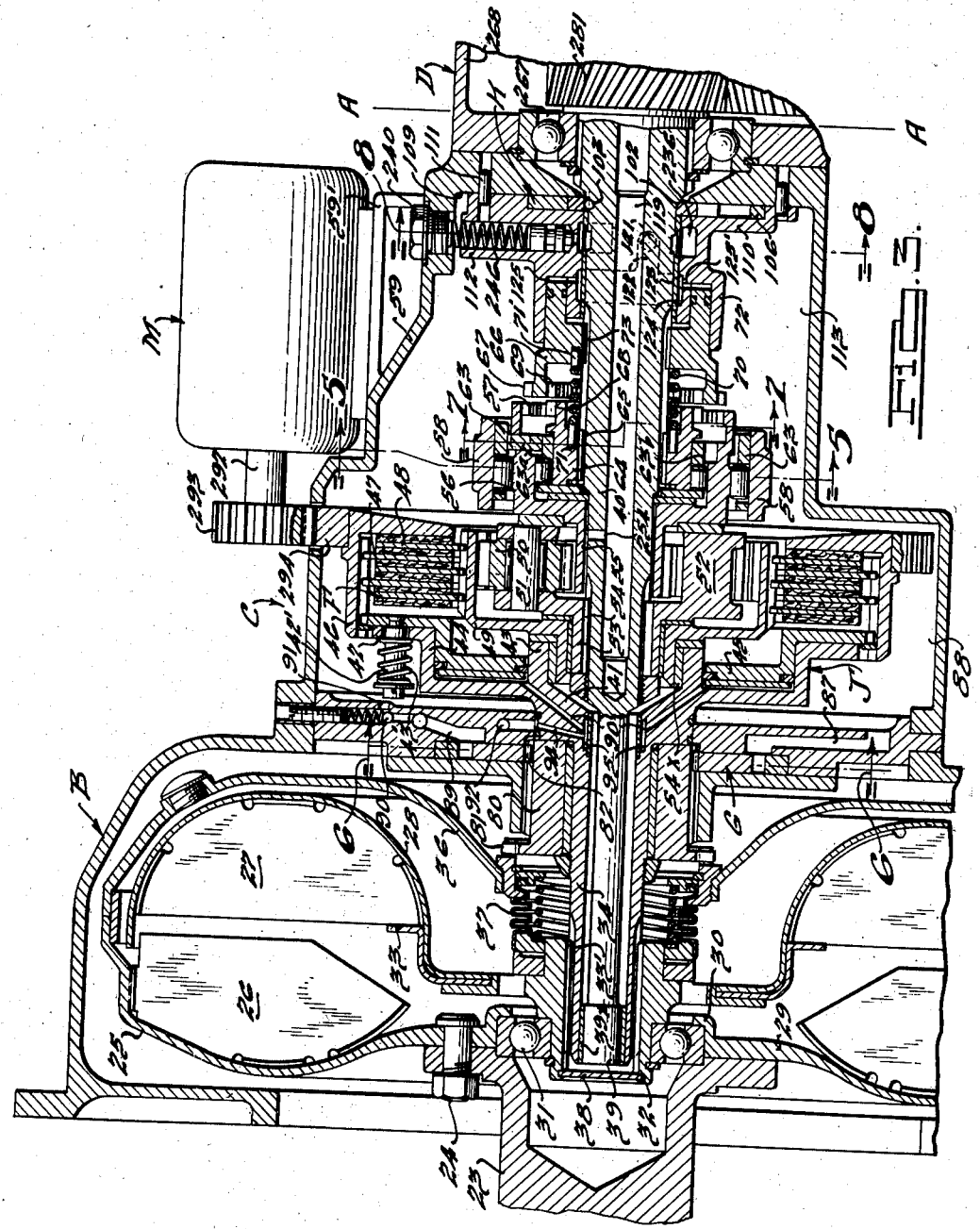

July 7, 1942.   C. A. NERACHER ET AL   2,288,594
POWER TRANSMISSION
Filed May 1, 1939    6 Sheets-Sheet 3
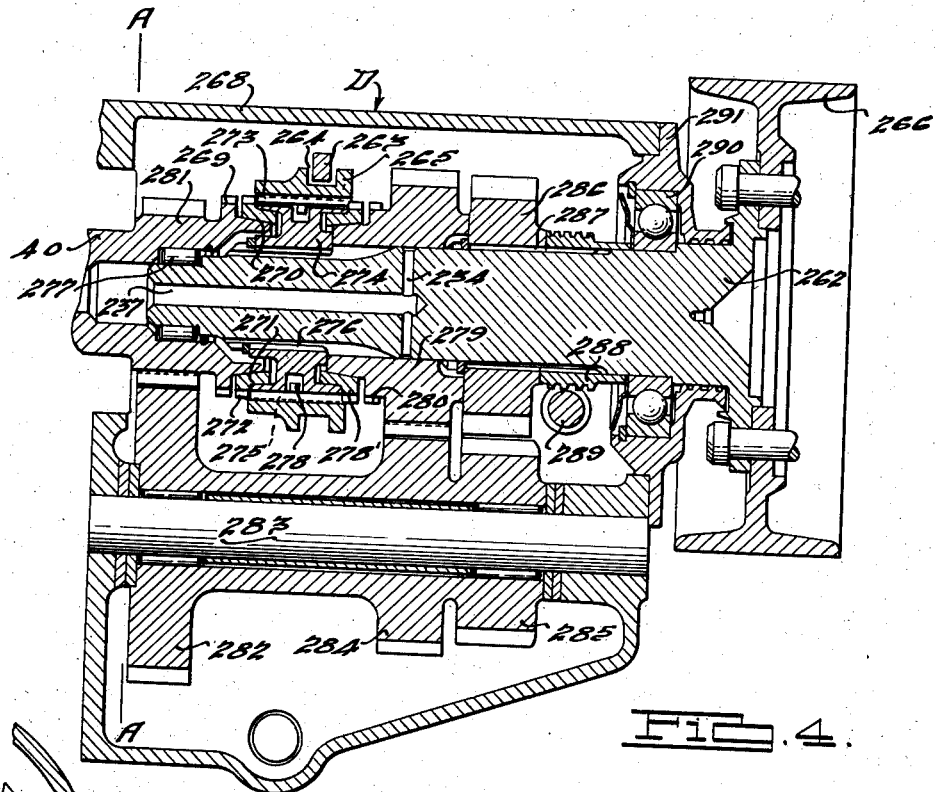
FIG. 4.
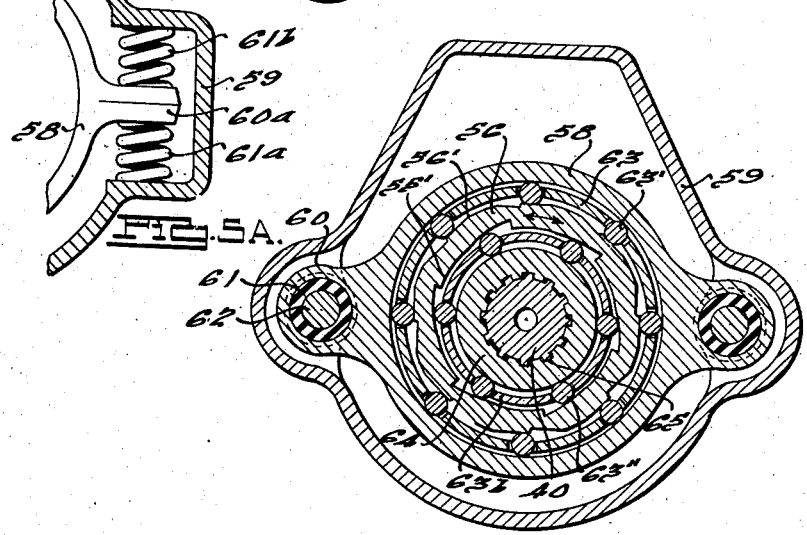
FIG. 5A.
FIG. 5.
INVENTORS.
Carl A. Neracher,
BY William T. Dunn.
Harness, Dickey, Pierce & Harris
ATTORNEYS.

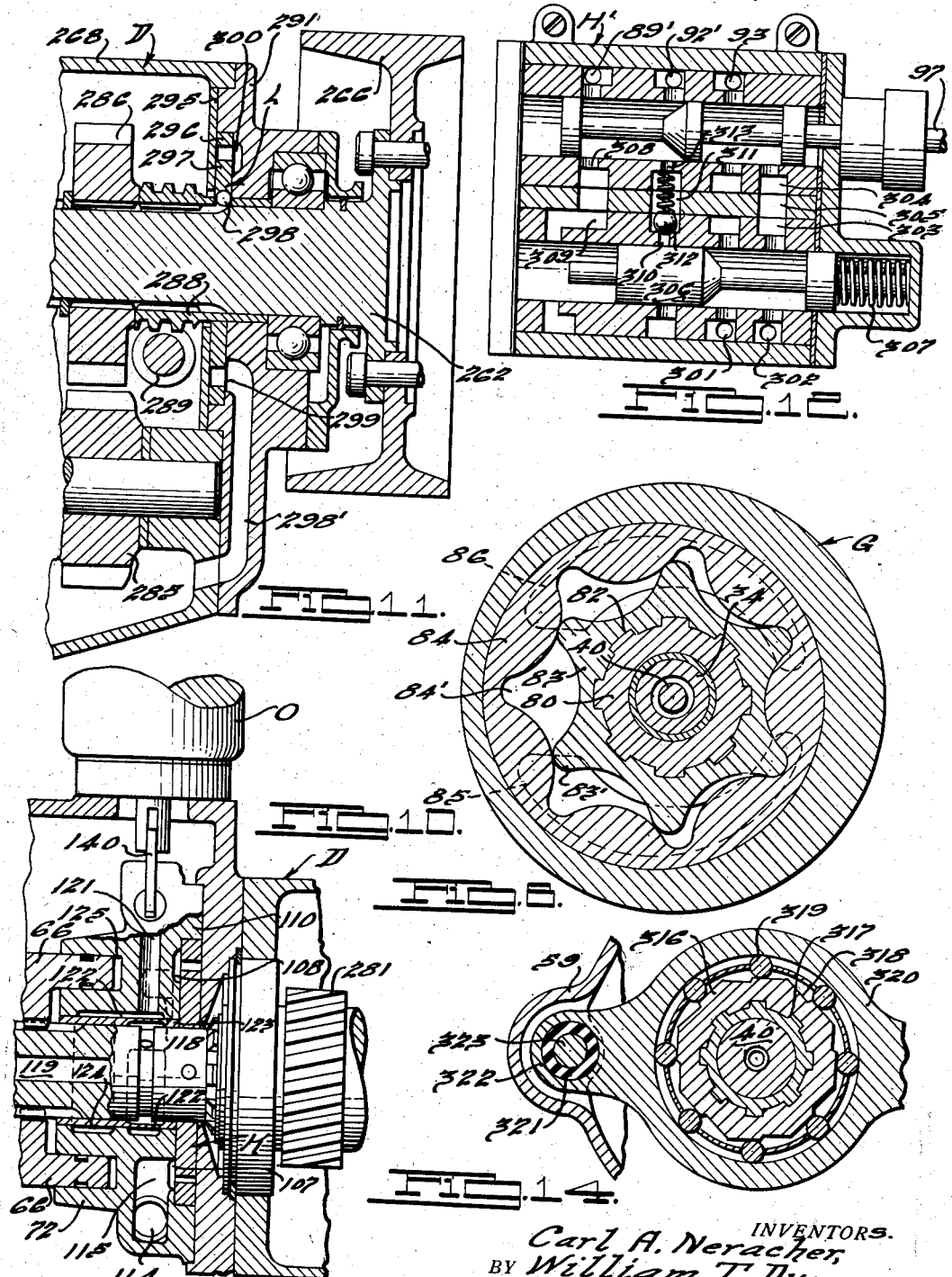

July 7, 1942. C. A. NERACHER ET AL 2,288,594
POWER TRANSMISSION
Filed May 1, 1939 6 Sheets-Sheet 5

INVENTORS.
Carl A. Neracher,
BY William T. Dunn.
Harness, Lind, Patie & Harris
ATTORNEYS.

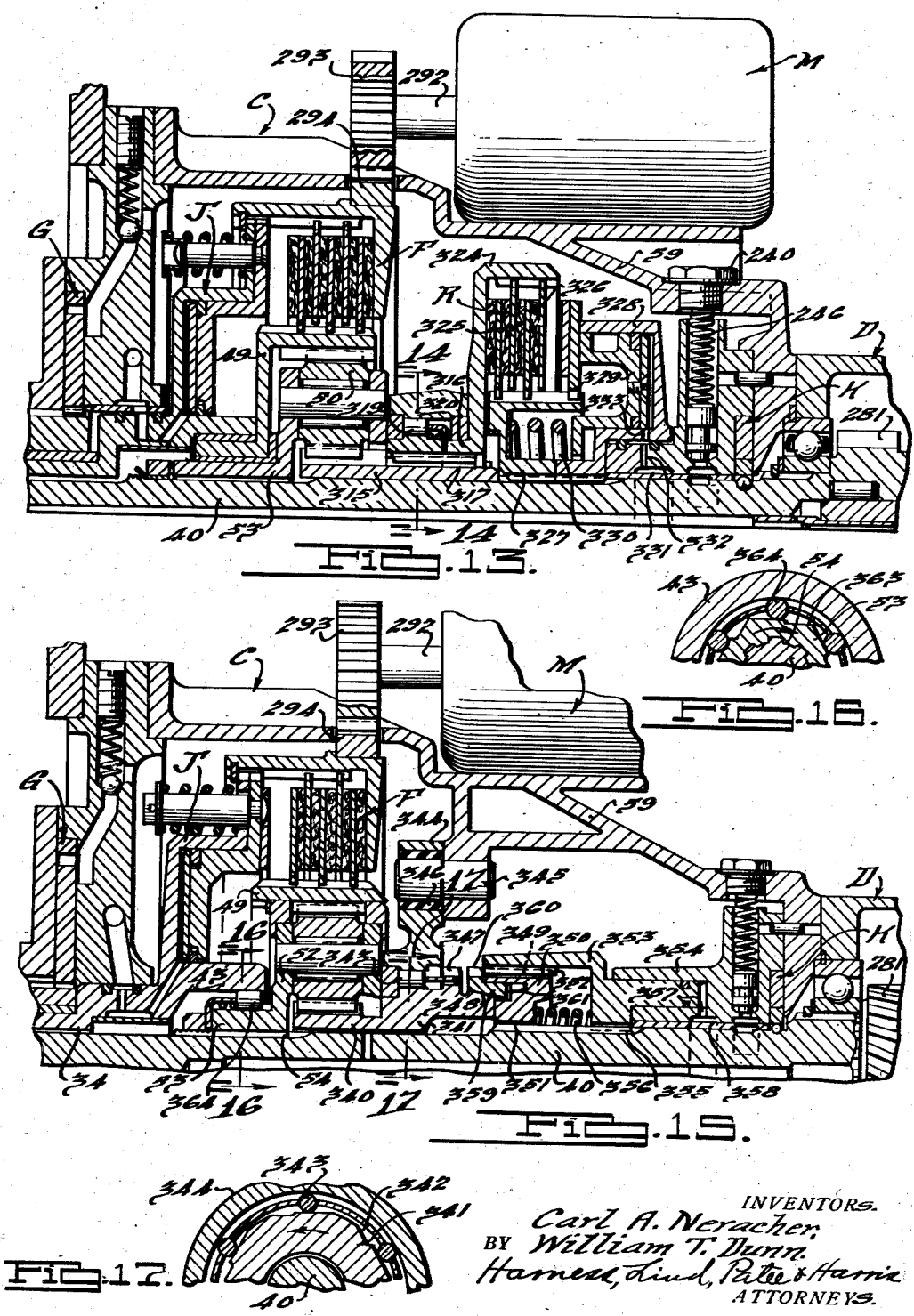

Patented July 7, 1942

2,288,594

UNITED STATES PATENT OFFICE 2,288,594

POWER TRANSMISSION

Carl A. Neracher and William T. Dunn, Detroit, Mich., assignors to Chrysler Corporation, Highland Park, Mich., a corporation of Delaware Application May 1, 1939, Serial No. 271,016

59 Claims. (Cl. 74—472)

This invention relates to power transmission of the type especially adapted for transmitting power for driving a motor vehicle.

One object of our invention is to provide an improved system of motor vehicle drive control embodying more desirable flexibility of speed ratio changing, improved ease of operation, better economy of driving; also many features of vehicle drive control which adapt themselves to driving conditions at any time.

Heretofore it has been customary in many motor vehicle transmission systems to employ a change speed transmission of general standard type, giving three forward speed ratios including direct and a reverse drive, together with an overdriving mechanism behind the standard transmission so that the drive passes first through the standard transmission and then to the overdrive mechanism. In such systems the usual relatively slow speed axle ratio of about 4.3 is customarily used. This well known overdrive mechanism provides an overrunning direct drive which is releasable, on release of the accelerator pedal to slow down the engine and the attainment of a predetermined vehicle speed such as forty miles per hour, to automatically engage a centrifugal clutch to effect an overdrive through a planetary gear set. When the vehicle speed in overdrive drops down to a predetermined speed at which the overdrive control clutch will automatically release, generally around 25 miles per hour, the drive is then automatically resumed in direct. This known arrangement is advantageous in slowing down the engine less than a direct drive to the usual propeller shaft with resulting fuel economy, reduction in engine wear, quieter operation of mechanical parts and other known advantages.

With the foregoing known overdrive arrangement, there is lacking a desired flexibility of drive control in that the overdrive is effective only on attaining a predetermined vehicle speed and once engaged cannot be released until the car speed has dropped as aforesaid. Such arrangement prevents the realization of overdrive economy for city driving which is ordinarily 75% of average driving conditions. There is also the disadvantage in that, when in overdrive, the unfavorable speed ratio drive prevents rapid car acceleration as is frequently desirable in passing another car or where for other reasons the engine is called on to suddenly deliver greater torque or to rapidly accelerate the car. If the overdrive cut-in speed were reduced to, say 20 miles per hour, to enable more economical running in the city, then the resulting unfavorable speed ratio would give sluggish performance for rapid acceleration in traffic conditions.

Further disadvantages of the aforesaid conventional overdrive mechanism are that a very sturdy gearing is required because it is behind the standard type transmission wherein torque can be multiplied; also the requirement for mechanism to render the direct drive overrunning clutch inoperative to enable driving the vehicle in reverse.

Our present transmission system overcomes the disadvantages of the aforesaid known type of overdrive mechanism and offers many advantages of structure, drive functions and economy not heretofore possible.

We preferably employ certain fundamental arrangements of parts such as the use of an underdrive or reduction drive mechanism ahead of a change speed transmission of conventional or other type, together with a relatively fast axle ratio in the neighborhood of 3.5 by way of example.

While the underdrive mechanism may have any desired number of speed ratio drives or changes, we preferably provide an arrangement whereby the drive through this mechanism is either direct viz., a speed ratio of 1 to 1, or an underdrive, viz., a speed reduction less than 1 to 1. More particularly, our underdrive mechanism is preferably so arranged that during normal car running the drive therethrough is a direct drive although the underdrive is obtained at will and during initial acceleration of the car from standstill thereby obtaining the advantage of more powerful and faster car acceleration. Thus the effect of a normal direct drive, in conjunction with the relatively fast axle ratio and a setting of direct drive in the change speed transmission behind the underdrive mechanism, is substantially the equivalent of obtaining an overdrive from the engine to the car driving ground wheels.

The direct drive offers advantages of quiet running and high economy for city as well as country driving conditions, our control system being such that the underdrive may be immediately brought into action at any time without shock or jolt to the passengers or the parts of the driving mechanism. Furthermore, the underdrive mechanism is operable at will from the underdrive to the faster drive, such as direct, without shock or jolt.

We have provided an underdrive mechanism which employs gearing of the planetary type for obtaining the underdrive ratio since this general type of gearing offers many advantages of quietness of operation, compactness and unique ability of control. During the direct drive the gearing is locked-up so that it turns as a unit with the driving and driven shafts of the underdriving mechanism.

We preferably employ a fluid coupling for providing a drive connection between the engine and the underdrive mechanism although our power transmission as a whole may be used in conjunction with other forms of clutches such as the ordinary plate-type friction clutch for releasing the drive between the engine and underdrive mechanism.

A fluid coupling is, however, employed by preference since, among its advantages are long life without wear since the circulating fluid provides the drive connection; inherent slip which accommodates the use of a relatively fast axle to great advantage since the engine can rapidly accelerate up to its maximum torque ahead of the parts driven therefrom, thereby increasing what is known as car performance or accelerating ability; smooth car get-away largely because at lower speeds the cushioning effect of the coupling is highest; elimination of rattle and backlash noises through the whole car driving mechanism and making highly accurate fits of parts less necessary since the engine torque impulses are not transferred back to the driven parts owing to the drive taking place through a liquid medium; reduction in the necessity for shifting gear or manipulating speed changes to the usual degree in the change speed transmission because of the slip characteristics of the coupling; elimination of wear as in the facings of conventional friction clutches; prevention of damage to driven parts of the car mechanism making it possible to use lighter and cheaper structures because of the softness of the fluid clutch action making abuse of the parts impossible; provision for safer and easier driving on slippery pavement because of the gentle acceleration and retardation characteristics; provision for safety feature if the engine should stall on a hill since the engine may be started without the driver declutching or removing his foot from the brake pedal; making unnecessary the driver holding his foot on the usual clutch pedal while the car is stopped in traffic; and providing for increased car performance without enlarging engines thereby offering lower weight and cost together with increased oil and fuel economy, and increased engine life.

We also employ a novel control system whereby the direct drive of the underdrive mechanism may be released at the will of the driver preferably by several independently operable driver controls. One of these controls is provided to enable sustained underdrive without the direct drive coming into action, this overall drive thus preventing automatic operation of the step-up drive.

Another of the aforesaid controls is operable in response to driver operation of the engine throttle adjusting mechanism to automatically effect a kick-down or step-down from direct to underdrive and, on release or partial release of the accelerator pedal, the direct drive is restored. Preferably the arrangement is such that the accelerator pedal has a kick-down range beyond its wide open throttle position, the pedal overtravelling the throttle valve. This operation of the accelerator pedal is a natural movement by the operator when desiring faster car acceleration which is readily obtained in the underdrive ratio without shifting the change speed transmission. Once the mechanism is operated for kick-down, the direct drive is, by preference, not restored until the accelerator pedal is substantially fully released thereby preventing undesired speed ratio changes within a narrow range of movement of the accelerator pedal. A further feature resides in the provision of control means, such as a dashpot, for regulating the operation of the direct drive when changing from underdrive thereby obtaining smooth change after kick-down for example.

We have provided a novel underdrive mechanism wherein one of the elements of the planetary gearing constitutes a drive control element in conjunction with the underdrive control means. This control element is adapted to be resiliently held, to take reaction of the underdrive. By providing the control means with an overrunning device between the reaction-taking element and a holding means therefor, the underdrive will be made to automatically function, while releasing in response to the faster or direct drive. The overrunning device thus is part of the underdrive while overrunning during the faster or direct drive.

For the relatively fast drive through the underdrive mechanism, we have provided control means in the form of a clutch adapted to lock the underdrive gearing to directly drive the driven shaft from the driving shaft. This clutch is arranged to engage automatically in response to predetermined car speed and, by preference, pressure fluid is utilized to engage the direct clutch, the supply of pressure fluid to operate the clutch being controlled by valving means adapted for operation in response to driver operation of the aforesaid driver controls. A further feature of our invention resides in the provision of novel means for controlling the length of time of car acceleration in underdrive before automatic engagement of the direct drive clutch takes place.

Another important feature of our invention resides in the provision of a novel blocker mechanism which prevents engagement of the underdrive lock-up clutch except when the two engageable elements of the clutch are rotating at synchronous speed, or substantially so.

Still another feature of our invention resides in the provision of novel engine starting means by means of which the vehicle engine is started by a small high-speed motor connected to the runner of the fluid coupling. Our novel engine starting means utilizes the slip inherent in the fluid coupling to permit the starting motor to quickly reach a relatively high speed thereby making it possible to overcome the static friction incident to the starting of a heavy engine without drawing a heavy surge of current from the vehicle battery.

We also provide novel mechanism for engaging the main clutch of the vehicle, which is normally engaged by pressure fluid supplied by an engine driven pump, under conditions during which it is desired to start the engine by towing the car.

Further objects and advantages of our invention reside in the novel combination and arrangement of parts more particularly hereinafter described and claimed, reference being made to the accompanying drawings which are illustrative of several embodiments of our invention and in which:

Fig. 1 is a diagrammatic side elevational view of our power transmission.

Fig. 1A is a diagrammatic plan view of the vehicle power transmission.

Fig. 2 is a longitudinal sectional view of the valve H of Fig. 1.

Fig. 2A is a detail sectional elevational view of a portion of the engine throttle valve controlling rod.

Fig. 3 is a sectional elevational view of the under-drive transmission mechanism and fluid coupling.

Fig. 4 is a side elevational view of the rear transmission mechanism this view being taken toward the right of line A—A of Fig. 3.

Fig. 5 is a sectional view taken along the line 5—5 of Fig. 3.

Fig. 5A is a fragmentary view of a modification of the mechanism of Fig. 5.

Fig. 6 is a sectional view taken along the line 6—6 of Fig. 3.

Fig. 10 is a sectional plan view illustrating a portion of the pressure fluid supply system for the direct drive control means.

Fig. 11 is a fragmentary sectional view illustrating a modification of the machanism shown in Fig. 4.

Fig. 12 is a sectional view of a modified clutch control valve adapted to be used with the Fig. 11 mechanism.

Fig. 13 is a fragmentary sectional side elevational view of a modified form of power transmission.

Fig. 14 is a sectional view along line 14—14 of Fig. 13.

Fig. 15 is a fragmentary sectional side elevational view of a further modification.

Fig. 16 is a sectional view along line 16—16 of Fig. 15.

Fig. 17 is a fragmentary sectional view along line 17—17 of Fig. 15.

Figures 7, 8, 9:
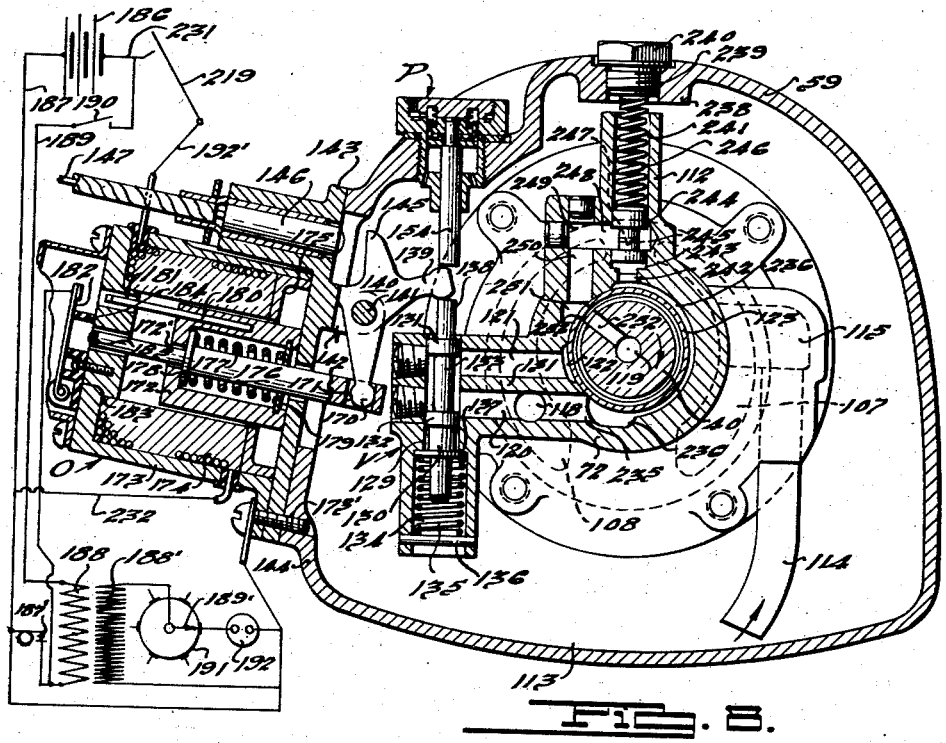
Fig. 7 is a section along the line 7—7 of Fig. 3.
Fig. 8 is a section along the line 8—8 of Fig. 3.
Fig. 9 is an enlarged view of the dashpot shown in Fig. 8.

Referring to the drawings and especially to Figs. 1 to 9 inclusive, it will be seen that we have elected to illustrate the principles of our invention in connection with power transmission for a motor vehicle although it is desired to point out that many of the features are capable of use to advantage in other forms of devices. We have illustrated in Fig. 1A, in diagrammatic form, a typical arrangement of the principal illustrative portions of our power transmission wherein reference character A represents a motor vehicle prime mover which is preferably in the form of the well-known internal combustion engine, the drive passing from said engine through a clutch which by preference is a fluid coupling B to the speed ratio changing means herein illustrated as comprising a forward underdrive mechanism C and a rearward mechanism D from which the drive may pass by way of a conventional propeller shaft 20 to the differential E and thence to the ground wheels 22 by way of the usual rear axle portions 21.

The engine A has its crankshaft 23 (Fig. 3) connected by fasteners 24 with the impeller 25 of the fluid coupling B, this impeller having the usual fluid circulating vanes 26 which extend substantially radially of the axis of rotation of the impeller and which are spaced circumferentially around the impeller so that the fluid medium, such as oil, is caused to travel outwardly by centrifugal force in the spaces between the vanes 26 for discharge into the spaces between the vanes 27 of the runner 28 whereby the latter is driven from the impeller in a manner which is generally well known.

In order to facilitate the manufacture of the fluid coupling, the impeller may be mounted on the crankshaft 23 by means of a hub 29 which in this case is formed integrally with the impeller and has a rearwardly extending shoulder portion 30 adapted to receive the outer race of a bearing 31, the inner race of which is carried by a second hub 32, the latter being fixed to the runner 28 by welding or other suitable means. The reference numeral 33 designates a baffle ring which has the well-known function of interrupting the circulation of the fluid in the coupling during the period that the engine is idling to thereby minimize the drag through the coupling at times when drive is not desired.

The runner 28 is thus centered and journaled by its hub 32 and the bearing 31 within the hollow hub 30 which is rigidly carried by the crankshaft 23. Disposed within hub 32 and splined for driving connection therewith at 33' is a forward reduced end portion of a hollow shaft 34, this shaft extending forwardly within the bearing 31 for centering support thereby and constituting the driving shaft for transmitting drive from engine A and fluid coupling B to the forwardly disposed underdrive portion C of the transmission mechanism.

The impeller 25 is formed with a rear housing portion 36 which extends inwardly around the runner 28 and is provided with any suitable type of fluid seal generally designated at 37 whereby escape of fluid is prevented at the rear portion of the runner 28. The forward end of the hub 32 is closed by a plug 38 for preventing escape of fluid rearwardly within this hollow hub. Disposed within bearing 31 and within the hollow forward end portion of the driving shaft 34 is the reduced forward end portion 39 of a driven shaft 40, the latter being the shaft which transmits drive from the driving shaft 34 to the rearwardly disposed portion D of the speed ratio changing mechanism. This shaft 40 is therefore in the nature of an intermediary shaft and becomes the driving shaft for the mechanism D. The forward shaft portion 39 is journalled by a bushing 39$^x$ within the shaft 34 and is thereby also centered by the bearing 31.

For convenience of reference, we will therefore, unless otherwise noted, refer to forward rotation as being the rotation corresponding to that of the crankshaft 23 which has the usual clockwise rotation viewed from front to rear, this being the direction of rotation of shafts 34 and 40 when transmitting drive to the mechanism D wherein we have located the usual means for reversing the normal direction of drive in order to operate the vehicle in reverse.

Underdrive mechanism C comprises a speed ratio changing mechanism employing planetary gearing and more particularly, this mechanism is arranged to provide selectively operable forward drives, one of which is a reduced or underdrive and the other of which provides a relatively faster drive of the driven shaft 40 with respect to the driving shaft 34. This relatively faster drive is arranged to provide a direct drive wherein the speed ratio is 1 to 1.

Driving shaft 34 extends rearwardly to provide an enlarged hollow intermediate portion 41 which extends radially outwardly to form the annular driving member 42 of a main driving clutch F. The portion 41 also has a pair of rearwardly projecting annular shoulder portions 43 and 44 which form a fluid cylinder J in which a piston 45 is adapted to be reciprocated. This piston 45 is connected to the portion 41 of shaft 34 by a plurality of pins 42' which permit the piston to have longitudinal movement relative to the portion 41, the connection between piston 45 and the clutch driving spider 46 being in the nature of longitudinal splines.

A plurality of coil springs 43' surround the pins 42' and act to urge the piston 45 toward the forward end of cylinder J. The driving spider member 46 of the clutch F has a plurality of annular fiber driving discs 47 splined thereto. Interleaved with the driving discs 47 are a plurality of driven discs 48 which are splined to an annulus gear 49 which is adapted to be drivingly connected with the shaft 34 by means of the clutch F. Meshing with this annulus gear is a plurality of planet gears or pinions 50, each planet gear being rotatively mounted on an axle shaft 51 supported by a carrier structure 52 having a forwardly extending hub portion 53 which extends within the hollow intermediate portion of the shaft 34 and is splined at 54 for direct driving connection with the driven shaft 40. A bushing 54ˣ journals the annulus gear within the shaft portion 43 of the shaft 34.

The planet gears 50 also mesh with a hollow sun gear 55 which is loosely journalled on the driven shaft 40 and has a rearwardly extending controlling portion 56 which has clutch teeth 57 on its extreme rearward end.

If desired, the fluid coupling B may be omitted and the crankshaft 23 may be connected directly to the shaft 34. It is, however, preferred to transmit the drive from the crankshaft to the shaft 34 through the fluid coupling because of the advantages inherent in such a drive which have already been pointed out.

From the mechanism thus far described, it will be apparent that drive from the engine crankshaft 23 may be transmitted through the fluid coupling B and clutch F, the plates of which are adapted to be drivingly engaged by means hereinafter to be described, to the annulus 49 of the planetary gearset. If the sun gear 55 is held against the tendency to rotate backwardly (counterclockwise) when the driving shaft 34 rotates forwardly (clockwise), then the annulus gear 49 will operate through the planet gears 50 to transmit an underdrive to the driven shaft 40 relative to the speed of rotation of the driving shaft 34 by virtue of the carrier 52 driving through the splines 54 on the driven shaft 40. During this condition of operation the sun gear 55, which is loosely journalled on the shaft 40, has a tendency to rotate in a counterclockwise direction and must be held against such rotation to provide reaction for the underdrive. The means for holding the sun gear against counterclockwise rotation consists of a reaction-taking or brake member 58 (Fig. 5) which is yieldably secured to the transmission casing 59 by means of a pair of diametrically oppositely located pins 62. At each side thereof the reaction member 58 has a boss 60 which has an enlarged bore surrounding the pin 62. A rubber bushing 61 completely fills the space between the bore of the boss 60 and the pin 62 thereby providing a resilient holding means for the reaction member 58. Besides providing a cushioned means for holding the sun gear 55 from backward rotation during operation of the underdrive, the rubber bushings 61 also permit a slight degree of universal movement of the member 58 which compensates for any inaccuracies in the parts of the overrunning devices about to be described.

Fig. 5A illustrates a modification of the device shown in Fig. 5, the only difference being in the cushioning element. In Fig. 5A, the reaction member 58 has an ear 60ᵃ at each side thereof. A pair of coil springs 61ᵃ and 61ᵇ disposed between each ear 60ᵃ and the casing 59, as shown, yieldingly holds the reaction member 58 against rotation with respect to the casing.

The control portion 56 of sun gear 55 has a cam 56' formed on its outer surface (as shown in Fig. 5) which forms one element of an overrunning device having a cage 63 carrying a plurality of rollers 63' which form a releasable locking means between the control portion 56 of the sun gear and the brake member 58. It can be seen from Fig. 5 that any tendency of the sun gear 55 to rotate in a counterclockwise direction will cause rollers 63' to move upwardly on the inclined surfaces of cam 56' thereby locking the sleeve 56 to the reaction-taking member 58.

In the event that the sun gear 55 is directly drivingly connected with one of the other elements of the planetary train, then the entire train will be locked to cause the gearing to rotate as a unit and transmit a direct drive from driving shaft 34 to the driven shaft 40. We have provided means for locking the sun gear to the shaft 40 for rotation therewith, and under such conditions, the sun gear 55 will rotate in a clockwise direction and will overrun the reaction-taking member 58 as will be permitted by the set of overrunning rollers 63'.

The means provided to lock the sun gear 55 to the shaft 40 is under the control of the vehicle driver and comprises a piston member 66 having a set of external teeth 67 adapted to mesh with the internal teeth 57 provided on the rearward end of the sleeve 56. Piston 66 is adapted to be reciprocated within the cylinder 72 formed in the casting 110 under the control of valve means which will be presently described. Casting 110 is secured to the rear inner wall of casing 59 by fasteners 111.

Referring to Figs. 5 and 7 in conjunction with Fig. 3, it will be seen that the control sleeve 56 of the sun gear 55 is also provided with an internal cam 55' which forms one member of a second overrunning device, the cage 63ᵇ of which is integrally connected to the cage 63 of the outer overrunning device by a plurality of legs or spoke members 63ᵃ as indicated in Figs. 3 and 7. The other member of the second or inner overrunning device consists of a blocker member 64 loosely splined to the shaft 40 as indicated at 65. Blocker member 64 has teeth 68 externally formed on the rearward end thereof which are adapted under certain conditions of operation to mesh with the internal teeth 69 formed on the forward end of piston member 66. A coil spring 70 fastened to the blocker member 64 as indicated at 71 and to piston member 66 as indicated at 71' surrounds the shaft 40 and acts to yieldably urge piston 66 rearwardly within cylinder 72 and to rotate blocker member 64 counterclockwise so as to engage the internal spline teeth of blocker member 64 against one side of the external mating teeth on shaft 40.

So far as has been described, the operation of the device is as follows: Let it be assumed that the annulus gear 49 is being rotated by means of the motor A, the drive therefrom being transmitted through fluid coupling B and clutch F (which is adapted to be engaged by means which will presently be described). The sun gear 55 will be locked against reaction member 58 through the overrunning rollers 63' and underdrive will be transmitted to the shaft 40 through the planet gears 50 and carrier 53. Blocker member 64 and piston member 66 which are both splined to shaft 40 will rotate therewith, the blocker member 64 being urged in a counterclockwise direction by the spring 70 so that the blocker teeth 68 are misaligned with the internal teeth 69 formed on the piston member 66. The blocker member 64 overruns the control sleeve 56 and the teeth 57 of the sun gear 55 due to the action of the inner overrunning rollers 63" which during this period will be retained in neutral, non-driving as shown in Fig. 5.

It is apparent that the piston 66 is blocked against forward movement of the action of the blocker member 64 which during this stage is urged by the spring 70 into blocking position. Should fluid be admitted into chamber 125 in rear of piston 66 at a pressure high enough to overcome the force of spring 70, the piston can move forwardly only until the teeth 69 thereof abut teeth 68 of the blocker member 64. As can be seen in Fig. 3, the teeth 68 are slightly longer than teeth 57, thus it is clear that blocker member 64 will prevent contact between the teeth 57 (which are stationary) and the teeth 67 (which rotate at the speed of shaft 40) during the underdrive period.

The main driving clutch F is ordinarily maintained in engaged position by means of the fluid pressure supplied by the pump G. The pump G is more fully illustrated in Fig. 6 and comprises an inner driving member 83 driven from the rearward end of a sleeve member 80 by means of splines 82. The sleeve 80 has a toothed connection 81 with the impeller 36 as indicated in Fig. 3. The pump is of the well-known gerotor type, the driving member 83 having a plurality of teeth 83', one less in number than the companion internal teeth 84' of the outer driven pump member 84. This general type of pump is well-known in the art, the arrangement being such that the inner member 83 rotates in unison with the impeller 25 thereby rotating outer pump member 84 and causing fluid to be drawn into the crescent-shaped suction chamber 85 of the pump through a passageway 87 which opens into the sump 88 of casing 59. Fluid under pressure from the pump pressure chamber 86 is delivered through the passageway 89 into the valve H (see Fig. 2) wherein it enters said valve through the port 89'. Port 92' of the valve H is connected through passageways 92 and 94 with a chamber 95 which surrounds the forward reduced end portion of the shaft 40 as can be seen from Fig. 3. A plurality of passageways 90 connects the chamber 95 with the interior of the fluid pressure cylinder J for actuation of the piston 45. A spring-pressed ball check 90 is provided to limit the pressure of the pump G.

Port 93 of the valve H is connected with the sump 88 through a passageway not shown and vents cylinder J whenever the valve actuating rod 97 is actuated by means of the pedal 98 thereby permitting the springs 43' to disengage main clutch F.

Clutch F is engaged whenever the motor of the vehicle is operating and the pedal 98 is in its retracted position as shown in Fig. 1. When the vehicle operator desires to break the drive between the runner 27 and the annulus 49 of the planetary gearset for the purpose of shifting gear in the mechanism D, or for other reasons, he may release clutch F by depressing pedal 98 which actuates the rod 97 of the valve H forwardly, to thereby cut off communication between ports 89' and 92' and establish communication between ports 92' and 93 which will vent cylinder J. The fluid flowing under pressure from pump G will then unseat the ball 90 and flow into the interior of the casing through the passage 91. Release of the pedal 98 will cut off communication between ports 92' and 93 of valve H and re-establish communication between pressure port 89' and port 92' which is connected with intake passageway 96 of the cylinder J thereby causing piston 45 to move rearwardly and engage the driving clutch plates 47 with the driven clutch plates 48.

Means will now be described for effecting the automatic operation of the direct drive controlling means in response to acceleration of the car in underdrive whereby an automatic step-up is provided in the underdrive mechanism and such disclosure will also include the several independently operable driver controlled means for effecting release of the direct drive controlling means.

We preferably effect operation of the direct drive controlling means or piston 66 through the medium of pressure fluid supplied to the chamber 125 of the cylinder 72 by means of a pump K driven from the driven shaft 40 by means of a ball connection 103. The arrangement is such that when the car is standing still, fluid will not be delivered under pressure to the cylinder 72 but pressure fluid will be delivered to this cylinder whenever the driven shaft has a predetermined desired speed of rotation bearing a desired relationship with the speed of travel of the car.

The pump K is of the gerotor type and is similar to the pump G, the details of which are shown in Fig. 6. Referring to Figs. 3, 8 and 10, it will be seen that the pump K comprises an inner driving member 102 fixed to the driven shaft 40 by the ball fastener 103, this driving member having a plurality of teeth one less in number than the companion internal teeth of the outer driven pump member 106. The inner member 102 rotates with the driven shaft 40, thereby also rotating outer pump member 106 causing fluid to be drawn into the pump suction chamber 107 and to be delivered to the pump pressure chamber 108.

Pump K is rotatably located between the rear transverse wall 109 of the casing 59 and the housing portion of the casting 110 which is secured to the casing wall 109 by fasteners 111 as aforesaid. A supply of oil is maintained in the reservoir or sump 113 of the transmission casing, this oil being drawn through an intake tube 114 to suction chamber 115 (Figs. 8 and 10) formed in the casting 110, the chamber 115 being open to the crescent-shaped intake chamber 107. At the pump delivery the pressure fluid is passed from the pressure chamber 108 for delivery forwardly through the casting passage 118 whence the fluid divides into two paths or streams respectively leading to the chamber 125 of cylinder 72 and to an axial bore or passage 119 formed in the driven shaft 40 for distributing the oil for lubricating purposes to the parts of the underdrive mechanism C and also preferably to parts to be lubricated in the change speed mechanism D.

Following the path of the pressure fluid from delivery passage 118 to the chamber 125 of cylinder 72, the fluid passes through the passage 120 to the valving means generally designated at V and from this valving means the oil is delivered transversely inwardly through the passage 121 to a longitudinally forwardly extending groove 122 closed inwardly by a sleeve 123 surrounding the driven shaft 40 and secured thereto against relative rotation. The groove passageway 122 extends forwardly to an annular chamber 124 which surrounds the sleeve 123 and has a plurality of outwardly extending radial passages 125' for delivering the fluid from the annular chamber 124 to the chamber 125 in rear of the piston 66. As can be seen from Fig. 3, the piston carries a pair of annular expanding sealing rings which prevent escape of the fluid forwardly thereof. It will therefore be apparent that rotation of the driven shaft 40 in its normal forward direction will operate the pump K and cause pressure fluid admitted through the intake 114 to be delivered from pump K to the controlling valving means V thence to the chamber 125 for operating the piston 66 forwardly to effect engagement of the clutch teeth 67 with the mating teeth 57 to establish direct drive from shaft 34 to shaft 40. However, as explained above, during the period when the car is being driven in underdrive, blocker member 64 which is loosely splined to shaft 40 is urged in such direction by the spring 70 that the teeth 68 thereof are in blocking position with respect to the teeth 69 of the piston 66. As aforesaid, the teeth 68 of blocker member 64 are slightly wider than the teeth 57 of the sun gear 55. It will therefore be seen that even though the pressure of the fluid in chamber 125 is high enough to overcome the force of the spring 70, teeth 67 cannot contact teeth 57 so long as the teeth 68 of blocker member 64 are in such position that they abut the teeth 69.

Let it be assumed that the valving means V is in the condition shown in Fig. 8, that the car is being driven in underdrive and that the speed of the car is such that the pressure in chamber 125 is sufficient to overcome the force of spring 70.

Piston 66 will have been moved forwardly until the teeth 69 abut the blocker teeth 68 on blocker member 64. Direct drive relation of the parts may now be established in response to a momentary release of the engine throttle controlling means by the driver.

Release of the throttle controlling means will cause a reversal of driving force through the underdrive mechanism, the driven shaft 40 becoming the driving shaft and the drive shaft 34 tending to decrease in speed due to decrease in torque delivered from the engine. Under such conditions, annulus gear 49 will drop off in speed and will become the reaction element of the planetary train instead of the driving element. Planet carrier 52 which is splined to shaft 40 will then begin to drive sun gear 55 in a forward (clockwise) direction, the control sleeve 56 overrunning the member 58 through the rollers 63'. The sleeve 56 will immediately become drivingly locked to the blocker member 64 because of the cam 55' which will then wedge the rollers 63" (see Fig. 5) into driving engagement. Blocker member 64 will thus tend to drive the shaft 40 and will rotate forwardly slightly with respect to said shaft because of the loose spline connection 65. This slight forward rotation of the member 64 is designed to be just sufficient to unblock the teeth 69 which action will allow said teeth to engage the teeth 68 and permit the piston 66 to move forwardly thereby engaging teeth 67 with the teeth 57 on sleeve 56. At this stage, the members 56, 64 and 76 are all rotating forwardly with the shaft 40 thus the engagement of teeth 67 with teeth 57 is accomplished positively and silently.

Opening of the engine throttle will now cause the vehicle to be driven forwardly with the planetary gearset locked up to rotate as a unit, thereby giving a 1:1 driving ratio through the mechanism C.

Under certain conditions of operation, it may occur that the teeth 57 will be in such position with relation to the teeth 67 that these two sets of teeth will abut and block the forward movement of piston 66 during release of the driving force as described above. In such case, at the instant the driver opens the throttle to accelerate the vehicle, there will be a tendency for the piston 66 to rotate forwardly (clockwise) with relation to the member 56 which will tend to rotate rearwardly (counterclockwise) due to the drive through the planetary gearset. A very slight relative movement of these parts will, of course, unblock the teeth which will slide into mesh under the influence of the pressure fluid in rear of piston 66 thereby establishing direct drive.

If desired, either the teeth 57 or 67 (or both sets) may be beveled slightly to facilitate meshing.

During the above described cycle of operation, the overrunning rollers 63' and 63" will have a definite relation because of the interconnection of the cages 63ᵇ and 63. In other words, the rollers 63" will always be in non-driving position during the period when rollers 63' are locked, and rollers 63' will be held in their neutral position during the period of lock-up between the members 56 and 64 through rollers 63".

This feature is of paramount importance in the efficient operation of the transmission as it prevents an uncontrollable "no-back" condition which might occur if the car were driven against an obstruction with sufficient force to spring the bumper thereof. Under such conditions, with the transmission in gear, a backward thrust would be exerted on the vehicle by the bumper which would tend to turn the shaft 40 backwardly and wedge both sets of overrunning rollers into lock-up position thereby making it impossible for the driver to manipulate the transmission D out of gear because of the frictional load on the teeth of the engaged gears or clutches in said transmission. With the arrangement illustrated in Figs. 3, 5 and 7, an uncontrollable "no-back," such as that just described, can never occur because the interconnecting spokes 63ᵃ maintain a definite and fixed relationship between the roller cages 63 and 63ᵇ. When the rollers 63' are in lock-up position, the rollers 63" will be held in neutral position by the cage 63ᵇ and, similarly, when rollers 63" are in lock-up position, rollers 63' will be held in neutral by cage 63.

The valving means V is carried by the casting 110, this portion being formed with a vertical valve receiving bore 129 adapted to slidably receive the valve member 130 formed with the bearing portions 131 and 132 and the intermediate reduced portion 133 adapted, when in the Fig. 8 position, to establish communication between the passages 120 and 121. The casting has a downwardly opening enlarged bore 134 receiving a coil spring 135 seated by a pin 136 and thrusting upwardly against a washer 137 to urge the valve member 130 into its pressure fluid delivery position illustrated in Fig. 8. This valve member has an upwardly extending stem 138 engaged by a finger 139 of a lever 140 pivotally supported at 141 to a bracket 142 carried by a cover member 143 which is secured to the side wall 144 of the casing 59.

The lever 140 has a second finger 145 adapted to be engaged by a plunger operator 146 secured to the rear end of a Bowden wire operating mechanism 147 the forward end of which terminates in a knob or handle 148 comprising a driver operated control element mounted in a support 149 at a point for convenient operation by the driver such as dash or instrument panel 150 (see Fig. 1). When it is desired to render the direct drive inoperative for sustained underdrive through the planetary underdrive unit C, the driver pushes the knob 148 to operate the Bowden wire mechanism 147, thereby causing the plunger 146 to move inwardly and engage finger 145 thereby swinging the lever 140 in a clockwise direction as viewed in Fig. 8. This movement of lever 140 causes finger 139 to move the valve member 130 downwardly against the spring 135 until the bearing portion 131 of the valve member is opposite the casing portion 151 between the passages 120 and 121. This opens the pressure fluid delivery passage 121 to the reservoir 113 and the fluid is free to flow outwardly of the passage 121 and upwardly about valve bearing portion 131 for discharge at the upper end of the bore 129 and at the same time the pressure fluid in passage 120 is trapped at the reduced portion 133 of the valve member 130 to cut off the pressure fluid supplied to passage 121 and chamber 125 of cylinder 72.

When the valve member 130 is thus moved downwardly, the spring 70 operates to move piston 66 rearwardly in cylinder 72 so as to disengage the teeth 67 from the teeth 57 and at the same time forces the pressure fluid in chamber 125 in the opposite direction through the system of passages between the chamber 125 and the passage 121 adjacent the valve 130. Any suitable friction or detent means may be employed at any convenient point in the Bowden wire mechanism in order to releasably hold the knob 148 either in the position illustrated in Fig. 1 or in its aforesaid position for holding the valve member 130 downwardly against the restoring action of the spring 135. In Figure 1 we have illustrated a detent 152 which acts on the Bowden wire mechanism at the housing 149.

We have also provided means for cushioning the restoring movement of the valve member 130 when the spring 135 acts to move the valve member upwardly from the position of shutting off the supply of pressure fluid to the chamber 125 of the cylinder 72 to the position illustrated in Fig. 8. This cushioning means comprises a dashpot generally designated at P (Figs. 8 and 9). This dashpot comprises a plunger or piston 153 having a downwardly extending rod portion 154 engaging the upper portion of the finger 139 so that this finger is disposed between the valve stem 138 and piston rod 154. The piston 153 carries a flexible seal 155 slidable in a cylinder 156 formed in a cup 157 threaded at 158 within the upper wall of casing 59, the cup having internal threads at its upper end portion for threadedly receiving the abutment plug 161. The cup member 157 is seated in a recess portion of the casing 59 as illustrated in Fig. 8, the abutment 161 serving to yieldingly limit upward movement of piston 153 under the influence of spring 135. Piston 153 and abutment 161 provide an annular air compressing chamber 164 so arranged that, when the piston 153 moves upwardly, air is trapped in the chamber 164 thereby regulating and cushioning the upward movement of the valve stem 138 for insuring a smooth and gradual forward movement of piston member 66. The abutment 161 has a depending annular flange 165 adapted to seat against an upstanding companion flange 166 where, between the cup portion 157 and at one or more points, the abutment 165 has a small groove 167 which provides restricted communication between the air compressing chamber 164 and a second annular chamber 168 within the upper portion of the cup member 157, the chamber 168 being open to the atmosphere through one or more passages 169.

When the underdrive mechanism C operates to effect a change in the drive from the underdrive to the direct drive by the upward movement of the valve member 130 to the position shown in Fig. 8, this upward movement of the valve member is controlled by the dashpot P to effect a smooth and gradual application of the pressure fluid to the rear of the piston 66 thereby effecting forward movement of the piston without undesired jolt or shock to the operating parts of the transmission. This dashpot is of particular significance with regard to the manipulation of the throttle operating mechanism after kick-down when used with the modification shown in Fig. 13 which will be described later on in the specification. Inasmuch as the present modification incorporates a blocker member which prevents engagement of the teeth 67 with the teeth 57 except under such conditions that the piston 66 and the sun member 56 are rotating at substantially synchronous speed, dashpot P may be omitted without affecting the operation of the transmission. We prefer, however, to use the dashpot when effecting a change in the drive from underdrive to direct drive because it permits more gradual build-up of pressure in chamber 125 thereby causing the piston 66 to move forwardly against the action of the spring 70 in a smooth and gradual manner.

The lever 140 is also provided with a downwardly extending finger 170 disposed within the opening 171 of an operating plunger 172 of the electrically energized solenoid O. This solenoid may be of any well-known suitable type and is so arranged that when energized the plunger 172 is moved outwardly to swing the lever 140 in a clockwise direction as viewed in Fig. 8 to thereby move the valve member 130 downwardly to cut off the pressure fluid supply to chamber 125 independently of the corresponding operation of the valve member 130 by the knob 148, so that when it is desired to provide sustained underdrive, it is not necessary to maintain solenoid O in energized condition. When the solenoid O is deenergized, the spring 135 serves to restore lever 140 and plunger 172 to the positions of these parts shown in Fig. 8 so that the pump K will deliver pressure fluid to the chamber 125 of the cylinder 72.

When the vehicle is being driven in direct drive, the underdrive mechanism may be brought into operation at the will of the driver by energizing the solenoid O through mechanism which will now be described. The solenoid O is contained within a casing 173 which is mounted on the right side of the transmission casing 59 adjacent the rear end thereof. The casing 173 has a lateral flange secured to the portion 144 of the casing 59 by means of suitable fastening means such as the screw 173'. Contained within the casing 173 is the usual solenoid coil 174 spaced from the plate-like extension of the portion 143 by a spacer 175 which has a central opening accommodating the solenoid core 172. The latter has an enlarged central opening through which extends the actuator rod 176 and within which is disposed a coil spring 177 surrounding the rod 176. One end of the spring 177 abuts a washer 178 fixedly mounted on the rod 176, the washer abutting the adjacent face of the radially inwardly extending portion of the end wall of core 172 which portion has an opening 172'. The opposite end of the spring 177 seats against an abutment 179 secured to the core 172. The relation of spring 135 to spring 177 is such that when the latter is compressed by movement of the core 172 to the left, as illustrated in Fig. 8, the built-up energy is sufficient to move rod 176 and bell-crank lever 140 to the right against the resistance of the spring 135 for cutting off communication between passages 120 and 121 of the fluid control system.

Carried by and movable with the solenoid core 172 is a metallic rod 180 having a portion thereof projecting axially beyond the adjacent end face of the core and extending into an opening 181 in the end face of casing 173. The rod 180 is adapted upon movement of the core 172 toward the left in response to energization of the solenoid to engage a contact point on an oscillatable switch blade 182 which is included in the engine ignition system as hereinafter set forth. The switch blade 182 is carried by an insulating mounting 183 which is secured to the casing 173 by suitable fastening means as indicated in Fig. 8. An insulating leg 184 is carried by the blade 182 and engages the end face of casing 173, it being understood that the blade is yieldably urged to the position shown in Fig. 8 by suitable means such as a relatively light spring.

The end face of the casing has an opening which accommodates the reduced end portion of the rod 176, said portion being provided with an electrically insulated extremity 185 engageable with the switch blade 182 for the purpose hereinafter set forth, it being understood that the rod 180 is adapted upon energization of the solenoid to engage the switch blade contact point prior to engagement of the insulated extremity 185 of actuator rod 176 with the switch blade. As will be presently apparent, the rod is moved to engage the contact point of switch blade 182 for normally interrupting the engine ignition circuit while subsequent engagement of the insulated extremity 185 of rod 176 with the switch blade reestablishes the ignition circuit.

The switch 182 is included in the internal combustion engine ignition system or circuit which may be of any desired type and as herein illustrated (diagrammatically) includes the usual storage battery 186 having a connector 187 to the primary 188 of the ignition coil and a return connector 189 in the latter of which is interposed a suitable ignition switch 190. The circuit also includes the secondary coil 188' connected with a movable member 189' of the distributor, generally indicated at 191, the latter having a series of stationary contacts connected by circuit wires to the respective spark plugs of the vehicle engine. One such connection is indicated in the diagram for the insulated member of the spark plug 192 the opposing member of the spark plug being grounded to the engine as is also the secondary coil 188', these two elements being connected for convenience to the screw 173'. The solenoid coil 174 is connected to the aforesaid circuit by wire 192' which leads to the battery 186 through switch 219 and through wire 232 which is connected to the connector 187 leading to the other side of the battery.

The usual make-and-break switch indicated at 187' operates in timed relation with the movable member of the distributor 189'. That is to say, the make-and-break contact is broken as the movable member of the distributor engages a respective contact point and make-and-break contact is made as the member 189' breaks contact with the aforesaid point.

The switch 219 is controlled by manipulation of a suitable vehicle driver operable member illustrated herein as the accelerator pedal for the engine throttle control mechanism. Referring now to Figs. 1 and 8, the engine A is provided with the usual intake manifold 193 to which is conducted the usual gasoline and air mixture from a carburetor 194 under the control of butterfly valve 195 adjustable by a lever 196 so that when the throttle valve is in its wide open position the lever 196 will engage a stop 197 to prevent further throttle opening movement of lever 196. An operating rod 206 has one end thereof pivotally connected as at 206' to the lever 196, the other end of the rod being operatively connected to a lever 204 pivotally supported on the vehicle at 205 for swinging movement.

The swinging movement of lever 204 is controlled preferably by a foot operable accelerator pedal 198 pivotally supported at 199 on the vehicle driver compartment toe board 200, a spring 201 yieldably urging pedal 198 upward to throttle closing position. A short arm 202 operatively connects pedal 198 with lever 204.

Throttle valve actuating rod 206 is pivoted to throttle control lever 196 through a "lost motion" mechanism generally indicated at 222 and more clearly illustrated in Fig. 2A. The rod 206 is adapted to slide through an opening in the ear 223 of the bracket 224 this bracket having a forward portion secured to a guide block 225 provided with a rearwardly open bore and having pivotal connection at 206' with the throttle control lever 196. Rod 206 has fixed thereto a collar 226 forwardly adjacent the ear, a preloaded spring 227 surrounding the rod and acting between the block and collar so that normally this spring serves as a connection between rod 206 and block 225. The spring 227 functions as an overtravel spring and permits rod 206, lever 204 and pedal 198 to have a certain amount of overtravel after lever 196 has engaged the stop 197. During the overtravel of accelerator pedal 198, spring 227 advises the driver that he is manipulating the accelerator pedal for actuation of the kick-down mechanism by reason of the extra resistance in addition to spring 201 afforded by the compression of spring 227 when the collar 226 moves toward the block 225. In other words, when the accelerator pedal is manipulated for kick-down, an extra resistance is encountered by reason of compressing the spring 227 during operation of the Fig. 2A mechanism which accommodates overtravel of the accelerator pedal beyond its wide open throttle position. The forward end of rod 206 is slidably disposed in the bore 228, the bracket 224 limiting the separating tendency of rod 206 and block 225 under the action of the spring 227.

When the accelerator pedal 198 is depressed to open the throttle valve 195, link 202 operates to swing lever 204 forwardly about pivot 205, the rod thrusting the block 225 forwardly without relative movement therebetween so as to swing lever 196 forwardly and, as the accelerator pedal is depressed to the end of the range of opening throttle movement, the lever 196 will engage stop 197. The accelerator pedal 198 is adapted to have a further range of movement for overtravelling the throttle valve, while maintaining the latter in its wide open throttle position, and in order to accommodate this overtravelling movement, the mechanism illustrated in Fig. 2A comes into action so that during forward overtravel of rod 206, said rod will slide into the bore 228 and compress spring 227 without forwardly moving the block or the throttle operating lever 196. Upon release of the accelerator pedal 198, the spring 227 assisted by spring 201 operates to restore the parts to the throttle closed position illustrated in Fig. 1. During this return movement of the parts, rod 206 and the parts associated therewith move relative to the block 225 and lever 196 until the collar 226 engages the ear 223 of the bracket 224 and thereafter the spring 201 will move rod 206 along with the block 225 and lever 196 without lost motion until the throttle valve 195 is restored to the closed position and the accelerator pedal 198 is correspondingly positioned as in Fig. 1.

The aforesaid overtravel movement of the accelerator pedal 198 is adapted to effect energization of the solenoid O through operation of the switch 219. The switch operating lever 215 is fixed to the aforesaid lever 204 and is adapted to move therewith, this lever 215 having a pair of switch operating fingers 216 and 217 alternately engageable with the swinging operating element 218 of switch 219 which is preferably of the well-known snap-over type and is provided with contacts 220 and 221. Contact 220 is connected to wire 192' which leads to one side of the solenoid coil 174 (Fig. 8) and contact 221 is connected to one side of the battery 186 through wire 231.

In the fully released (throttle closed) position of the accelerator pedal 198 as shown in Fig. 1, the finger 216 has operated the switch element 218 so that the switch is open and when the accelerator pedal 198 is depressed to the limit of its aforesaid throttle opening range of movement, the finger 217 has been swung upwardly about the lever support 205 and into engagement with the forward face of switch element 218. When the accelerator pedal is depressed for the aforesaid overtravelling range of movement, the finger 217 then swings the switch operating element 218 in a counterclockwise direction to cause this element to have the usual snap action in closing the switch 219. When the accelerator pedal is released to its wide open throttle position, finger 216 does not immediately engage switch element 218 for restoring the switch to its open position, this finger 216 engaging the switch element by preference when the pedal 198 nears the ends of its fully released position so that the last portion of the releasing movement of the pedal is utilized for causing the finger 217 to effect the snap-over switch opening movement of element 218 in restoring the parts to their Fig. 1 position.

It will therefore be apparent that we have provided what may be termed a kick-down control for the underdrive mechanism C so that, when the driver desires to effect release of the direct drive and to drive the car in the underdrive, he has only to depress the accelerator pedal 198 through the kickdown throttle overtravelling range of movement thereof to operate switch 219 to effect energization of the solenoid O which, is turn, will ground the ignition, operate valve member 130 downwardly to cut off the supply of pressure fluid to the cylinder 72 and, at the same time, vent the chamber 125 of the cylinder to the reservoir 113 thereby permitting spring 70 to move piston 66 rearwardly in cylinder 73 to disengage teeth 67 from teeth 57. The drive will then take place through the underdrive planetary gearing and when the driver releases the accelerator pedal to substantially the fully released position, switch 219 will be opened to deenergize solenoid O whereupon spring 135 will restore valve member 130 to the Fig. 8 position for supplying pressure fluid to chamber 125 of cylinder 72 to effect actuation of piston 66 forwardly in the cylinder to produce the step-up or direct drive from drive shaft 34 to driven shaft 40.

When the solenoid O is de-energzed as above described, the dashpot P comes into action to cushion the restoring operation of the valve member 130 so that the pressure build-up in the chamber 125 of cylinder 72 is smooth and gradual during step-up of the speed ratio drive. As aforestated, the dashpot P may be eliminated without adversely effecting the operation of the mechanism. It is, however, preferred to include the dashpot P in the mechanism so that a smooth and gradual movement of the piston 66 may be achieved.

When the underdrive is in operation, the sun gear 55 is prevented from backward rotation by the overrunning control device shown in Fig. 5, as aforesaid, it being apparent that when the teeth 67 on piston member 66 are engaged with the teeth 57 on the control sleeve 56 of the sun gear 55, the planetary train is caused to rotate forwardly as a unit with driving shaft 34 and driven shaft 40 and the sun gear sleeve control portion 56 thereupon automatically releases from its locked-up relation with the reaction-taking member 58. When the teeth 67 and 57 are engaged for effecting the direct drive, the kick-down control by the accelerator pedal is of advantage especially when the driver desires to quickly pass another vehicle on the road or at times when the driver desires power application from the engine A through torque multiplying gearing which is afforded from the planetary underdrive train. The kick-down control at the accelerator pedal 198 is therefore a control which is responsive to the natural impulses of the vehicle driver under the circumstances in that there is a natural tendency to depress the accelerator pedal to the full extent of its travel under the aforesaid conditions. Thus, when the accelerator pedal is fully depressed, the kick-down control is brought into operation to effect disengagement of the clutch teeth 67 and since the throttle valve 195 is then in the wide open position, the engine A immediately speeds up by an amount corresponding to the ratio of the underdrive gearing being limited by operation of the rollers 63' which lock the sleeve 56 to the reaction-taking member 58, thereby arresting the tendency of the sun gear 55 to rotate backwards. When the accelerator pedal is released sufficiently to deenergize solenoid O in restoring the teeth 67 to engagement with the teeth 57, the reversal of driving effort through the planetary gearset causes the sun gear 55 to rotate forwardly, thereby causing the sleeve 56 to be released from its locked-up condition with respect to the reaction-taking member 58 and in turn causing the inner cam 55' to move the rollers 63" into such position that the sleeve 56 is locked into driving relationship with the blocker member 64 which is thereby moved into non-blocking position to permit forward movement of piston 66 and engagement of the teeth 67 with the teeth 57. The same operation of the change speed gearing of the underdrive mechanism C takes place when the dash control knob 148 is manipulated by the vehicle driver although, as aforesaid, this control is preferably independent of the solenoid O so that when it is desired to drive a car in underdrive for a considerable period of time, it is not necessary to utilize electric current. It is also of advantage in the event that the dash control knob 148 is left in the underdrive position when the car is left standing since it does not tend to run down the battery 186.

We will now discuss the means for regulating or governing the supply of pressure fluid from pump K to the chamber 125 of cylinder 72 in order to determine the engagement of the teeth 67 with the teeth 57 as a function of the speed of the driven shaft 40 as well as the car driving speed, thereby also determining the time element in the automatic step-up from underdrive to direct drive when the car is started from rest. By way of example, this part of the system may be so arranged that the car will be accelerated in underdrive until it attains a speed in the neighborhood of twenty miles per hour, at which time the pump K will be pumping fluid in sufficient amount to produce the pressure necessary to move the piston 66 forwardly against the force of the spring 70. Obviously, if desired, the functional operating characteristics of the system for controlling operation of the piston 66 may be varied as desired, preference being to effect engagement of the direct driving mechanism at a relatively low car speed thereby obtaining the benefits hereinbefore set forth in connection with the use of the direct drive through the underdrive mechanism C when the car is operated for ordinary city driving as well as for country driving. The differential mechanism E at the rear driving axle preferably provides a relatively fixed drive between the propeller shaft 20 and the ground wheels 22 and with such an arrangement a direct drive condition in the mechcanisms C and D will provide an overall drive from the engine A to the ground wheels 22 of a character generally equivalent in overall speed ratio to prevent commercial types of overdrive power transmission systems. In view of the arrangement for convenient and fast operating kickdown from direct drive to underdrive in the mechanism C, the desired performance of a car for city driving is not lost in comparison with more conventional present day car performance. When the kickdown mechanism is operated during the time that the change speed mechanism D is set for direct drive, the overall speed ratio from the engine A to the ground wheels 22 in the preferred arrangement of our system is then, generally speaking, approximately equivalent to a direct drive setting of a standard transmission in the type of motor vehicle most commonly used at the present time.

Referring to Figs. 3, 8 and 10, the pressure fluid delivered by pump K into the passage 118 of casting 110 divides into two streams, one of which leads outwardly as aforesaid in the passage 120, and the other of which leads inwardly in the passage 235 for entry into the arcuate groove or chamber 236 which partially surrounds the sleeve 123. The casting 110 is formed with an outwardly extending boss 112 terminating at its upper end closely adjacent the underface of a boss 238 formed in the top portion of the casing 59 and having an outwardly extending opening 239 threadedly receiving an abutment closure member 240.

The boss 112 is formed with a bore 241 which extends radially outwardly with respect to the axis of driven shaft 40 coaxially with the casing opening 239. The lower end of bore 241 is provided with the neck portion 242 thereby forming a valve seat 243, this neck portion communicating with the upper end portion of the pressure fluid conducting chamber 236. Slidably disposed in bore 241 is a valve member 244 formed with a reduced portion 245, this valve being urged downwardly against seat 243 by a coil spring 246 having its upper end thrusting against the abutment closure member 240. The valve member 244 is provided with an axial fluid metering passage 247 communicating at its lower end with a neck portion 242 of the pressure fluid conducting system, the passage 247 extending upwardly through the axis of valve member 244 and having its upper end extending transversely of said axis for communication with the chamber 248 which surrounds the reduced valve portion 245.

When the valve member 244 is seated downwardly as in Fig. 8, the valve chamber 248 communicates with the outwardly extending casting passage 249 which is formed with a downward extension 250 terminating in the groove 251. This groove 251 communicates with the aforementioned lubricant conducting bore 119 of the shaft 40 through the sleeve passage 253 and the radial shaft passage 252.

When the vehicle engine is first started up and with the power transmission mechanism D manipulated to disconnect the engine from the ground wheels 22 by means which will presently be more apparent, the engine when idling will drive the shaft 40 in underdrive from shaft 34 assuming that the idle is sufficiently fast to cause fluid coupling runner 28 to be rotated by the impeller 25 and to cause the pump G to build up sufficient pressure to drivingly engage clutch F. With the engine so operating to impart drive to shaft 40 and with the change speed mechanism D set for neutral, the pump K will start delivering relatively small quantities of fluid from reservoir 113 under a relatively low pressure insufficient to cause movement of the piston 66. Furthermore, the arrangement is such that the pressure does not build up under such conditions because the metering passage 247 of valve member 244 delivers the fluid from the pump to the shaft bore 119 so that the fluid is used for lubricating purposes by distribution through bore 119 to the various lubricating passages in the running parts of mechanisms C and D which require lubrication. When it is desired to initially accelerate the vehicle, pedal 98 may be depressed to cut off the fluid pressure from pump G and vent cylinder J, thereby disconnecting the drive through clutch F to the annulus gear 49. The change speed mechanism D may then be manipulated to produce forward drive, for example, and the pedal 98 may be released to restore clutch F to driving condition, the engine throttle valve 196 opened in the customary manner to increase the power delivery of engine A and the car accelerated from standstill with the underdrive mechanism operating to drive driven shaft 40 forwardly from driving shaft 34 to a relatively slow speed. As the speed of rotation of shaft 40 increases, the pump K will deliver a proportionately increasing amount of fluid and one function of the valve spring 246 and metering passage 247 is to determine the conditions under which pressure fluid will build up sufficiently to effect forward movement of piston 66. It will be apparent that by suitably proportioning the strength of spring 246 in relationship with the metering passage 247 it is possible to provide for operation of the direct drive lock-up mechanism at the desired car speed of approximately twenty miles per hour or any other speed which may be desired.

As the pressure fluid delivery from pump K increases, the pump delivers more fluid than can pass through the metering passage 247 and the valve member 244 will then begin to move upwardly, further compressing spring 246 until the neck portion 242 communicates directly with passage 249. When the pump pressure builds up sufficiently to cause forward movement of piston 66 then any excess pressure causes valve member 244 to move further upwardly permitting additional quantities of fluid to escape from chamber 236 to passage 249 for delivery to the shaft bore 119. The valve therefore functions as a pressure release valve in addition to the functions thereof for regulating or governing the operation of the direct drive lock-up mechanism.

By arranging the upper end of boss 112 closely adjacent the underface of boss 238, the closure member 240 may be removed for replacing spring 246 and valve member 244 without danger of the valve member dropping between bosses 112 and 238 and falling down into the mechanism within casing 59. This arrangement also conveniently provides for substituting a spring in place of the spring 246 for changing the operative functions of the pressure fluid delivered by pump K also other valve members in place of the member 244 having differing capacities of metering passages to thereby produce variations in the pressure fluid delivery and operation of the direct drive lock-up mechanism.

The provision of metering passage 247 also insures constant delivery of the fluid to lubricating passage 119 whenever driven shaft 40 is rotating, the oil passing forwardly in the shaft bore from the delivery passage 252 for distribution to suitable outlet passages to the various rotating parts of the underdrive mechanism. One outlet passage is indicated at 254. The lubricating oil may also travel rearwardly in the shaft bore and into the bore 237 of transmission tail shaft 262 in the mechanism D from whence it may find its way into contact with the rotating parts thereof through suitable oil passages such as indicated at 234 in Fig. 4.

We have preferably provided a change speed transmission D having a plurality of forward driving speed ratios and a reverse drive between driven shaft 40 and the tail shaft leading from transmission D, and more particularly we have arranged this change speed transmission D to provide a selectively operable reduction drive and a direct drive. The arrangement is such that the driver may manipulate the reduction drive of transmission D in starting the vehicle to thereby obtain a double reduction operable until teeth 67 are engaged with teeth 57 by momentary release of the accelerator pedal when the vehicle has obtained a speed of twenty miles per hour or greater. Then, in order to obtain a still faster drive such as direct drive through the entire power transmission, the driver may manipulate the transmission D for direct drive therethrough, thereby stepping-up the drive in transmission D. As will presently be more apparent, the mechanisms C and D therefore provide, in fact, four forward speed ratios including a compound reduction drive through the reduction gearing of both mechanisms, a single reduction drive through mechanism C with mechanism D operating in direct, a single reduction drive through mechanism D with mechanism C operating in direct, and a direct drive with both mechanisms C and D operating in direct. In addition, the mechanism D may be manipulated to provide a reduction reverse drive which is arranged for compounding with the underdrive through mechanism C and by an appropriate setting of the pressure fluid build-up as will presently be more apparent, the power transmission will operate to automatically step-up the driving mechanism C for a direct drive therethrough during reverse in view of the fact that pump K is driven from driven shaft 40 which always has a forward direction of rotation so that pump K is never operated in reverse. Referring particularly to Figs. 1 and 4, the vehicle illustrated is provided with a stationary steering post or column 255 adapted to mount the vehicle operated steering wheel 256 for steering the front ground wheels, not shown, of the motor vehicle in any desired well-known manner, the steering movement from wheel 256 being transmitted downwardly and forwardly by the hollow shaft 257 which is disposed centrally within the column 255. Suitable gear shifting mechanism is associated with the column 255 for operation by a gear shift lever (not shown). This mechanism comprises, in general, a rod member 257 operatively connected at one end with the plate 256 and at its other end with bellcrank 258 which is, in turn, connected through rod 259 to a shifter lever 260 mounted on the side of the transmission casing D. Bowden cable 261 also interconnects the plate member 256 and the mechanism D. Inasmuch as the control mechanism for the change speed mechanism D forms no part of the present invention, it will not be described in detail. The features of the control mechanism are disclosed and claimed in the copending application of Carl A. Neracher et al., Serial No. 207,714, filed in the United States Patent Office May 13, 1938.

The drive from the underdrive mechanism C is connected to the change speed mechanism D by the intermediate driven shaft 40 and the drive from transmission D is transmitted to the propeller shaft 20 through the tail or out-put driven shaft 262. This tail shaft is adapted for rotation selectively in the forward direction of rotation of driven shaft 40 or in a reverse direction with respect thereto. As illustrated in Fig. 4, tail shaft 262 carries the usual brake drum 266 adapted for engagement by the usual brake means (not shown) for use as an emergency or parking brake. The driven shaft 40 has its rear portion journalled by bearing 267 in the casing 268 of the mechanism D, this shaft carrying the countershaft driving pinion 281 which is provided with direct drive clutch teeth 269 and a synchronizing friction cone surface 270 for synchronization operation with a companion friction clutching element 271, preferably having the blocker teeth 272 adapted to obstruct forward shift of the clutching teeth 273 or shift sleeve 265 when the latter is shifted forwardly to engage teeth 269 to establish direct drive through transmission D. The shift sleeve 265 has its teeth 273 slidably engaging corresponding teeth 275 of the hub structure 274 fixed by the splines 276 with the forward end portion of tail shaft 262 which is rotatably journalled by the bearing 277 within the hollow rear end portion of shaft 40. An expansion friction ring 278 frictionally engages the teeth 273 of shift sleeve 265 and releasably urges the synchronizing ring 271 against the friction surface 270 when the sleeve is shifted forwardly to produce blocking synchronizing action between the shafts 40 and 262, whereby the sleeve teeth 273 cannot be moved into positive clutching engagement with teeth 269 until the shafts are brought into synchronization as more particularly described in the aforesaid Neracher application. If desired, other forms of synchronizing means may be employed or the shafts may be arranged for clutching action with the synchromesh.

A similar synchronizing blocker ring 278' is disposed at the rear of hub 274 for controlling the rear shift movement of sleeve 265 to synchronize low speed gear 279 with tail shaft 262 prior to engagement of the shiftable clutch teeth 273 with the teeth 280 carried by gear 279, the latter being loosely journalled on tail shaft 262 and adapted to transmit low speed forward drive to the tail shaft when the shift sleeve 265 is clutched to teeth 280 aforesaid.

The gear 281 is in constant mesh with the countershaft cluster drive gear 282 journalled on the countershaft 283, the cluster having the further countershaft gears 284 and 285. Gear 284 is in constant mesh with the low speed drive gear 279 and gear 285 is adapted to transmit a reverse drive to the gear 286 through the intermediary of an idler gear (not shown) which may be manipulated into engagement with both of the gears 285 and 286 by suitable mechanism. The gear 286 is splined at 287 on the tail shaft 262, and when it is driven by the cluster gear 285 through the intermediary of the aforesaid idler gear, a reverse rotation is imparted to tail shaft 262.

A speedometer drive worm 288, splined on the tail shaft, is in mesh with the pinion 289 which drives the speedometer shaft in the usual manner.

In the operation of the transmission as a whole, we will assume that the selector element 260 is positioned for neutral and that the engine A is not operating, this being the condition of the parts when the car is parked. We will further assume that the power transmission system incorporates a fluid coupling B and that the dash knob 148 is in the Fig. 1 position so that the valve V and parts associated therewith are positioned as in Fig. 8, this being the preferred normal condition of the parts when the vehicle is left standing.

When it is desired to drive the car forwardly, the fluid coupling offers such advantages of car acceleration that in many instances it will be found preferable to start the vehicle with the change speed mechanism D manipulated for direct drive. However, for illustrating the various functions of the mechanism, we will describe the start of the vehicle with the transmission D set for its low speed forward drive, this drive affording greater torque modification than when the car is accelerated with the mechanism D in direct.

The engine A is started in the customary manner, transmission D still being in neutral and since shaft 40 usually offers resistance to forward rotation even with transmission D in neutral, the engine will have the tendency to drag the fluid coupling runner 27 forwardly, especially when the engine is turned over by means of the fast idle mechanism which is customarily employed and which operates during the period that the engine is warming up. Thus, the runner 27 will rotate the member 80, thereby causing the pump G to deliver pressure fluid to the cylinder J through ports 89' and 92' of valve H, pedal 98 being in retracted position as shown in Fig. 1. Clutch F will thus be engaged and annulus gear 49 will be rotated. Since the carrier 53 tends to remain stationary, sun gear 55 will have a tendency to rotate backwardly but will be prevented from this rotation by the wedging action of the rollers 63' of the outer overrunning device which will wedge into locking engagement with the reaction-taking member 58. Consequently the shaft 40 will have a very slow forward rotation ordinarily making it advisable to momentarily release the clutch F in order to shift the transmission D from neutral for initially accelerating the car.

The driver will therefore use pedal 98 as an ordinary clutch pedal, depression thereof will cause forward movement of the valve stem operating rod 97 to cut off communication between ports 89' and 92' of valve H and establish communication between ports 92' and 93 thereby venting the cylinder J. Clutch F is thus disengaged stopping forward rotation of annulus gear 49, carrier 53 and shaft 40. The driver may now manipulate the shifting mechanism to move the shift collar 265 rearwardly to effect engagement of the clutch teeth 273 with clutch teeth 280 thereby establishing a low speed drive through the mechanism D. Release of the pedal 98 and simultaneous depression of the accelerator pedal 198 to speed up the engine will smoothly engage the clutch F and the vehicle will start its initial forward acceleration through the planetary underdrive gearing compounded with the low speed gearing of the mechanism D.

As the vehicle accelerates and reaches the predetermined desired speed bearing the desired relationship with the speed of driven shaft 40 from which the pump K is driven, the fluid delivered by said pump will have reached the point where the pressure is sufficient to operate piston 66 forwardly. Accordingly, piston 66 will move forwardly in the cylinder 72 and the teeth 69 will abut the teeth 68 of blocker member 64. As aforesaid, the teeth 68 are slightly longer than the teeth 57, thus contact between the teeth 67 and the teeth 57 is prevented assuring noiseless operation of the underdrive during the acceleration period.

Direct drive may now be established through the underdrive mechanism by release of the accelerator pedal which will cause the motor A together with the associated driving mechanism forwardly of annulus gear 49 to decrease in speed. The driving torque through the underdrive mechanism will thereby be reversed, the shaft 40 becoming the temporary driving shaft. The annulus gear 49 will now tend to become the reaction element of the planetary train instead of the driving element, and the carrier 52 will begin to drive sun gear 55 in a clockwise direction causing the outer cam 56' of the sun gear control sleeve 56 to disengage from locking engagement with the rollers 63', and the inner cam 55' to wedge the rollers 63" into locking engagement with the blocker member 64 which will thus tend to be driven in a forward direction causing slight relative forward movement of the blocker 64 with respect to the shaft 40 because of the loose spline connection 65. This slight forward movement of the blocker member 64 will unblock the teeth 69 and permit piston 66 to move forwardly under the influence of the pressure fluid present in chamber 125 thereby engaging the teeth 67 with the teeth 57.

The driver may now depress the accelerator pedal and the car will be accelerated forwardly in what may be termed its second speed. When it is desired to again step up the speed ratio the driver has only to manipulate the aforementioned gear selector element and pedal 98 to move the shift collar 265 forwardly in the mechanism D to disengage the clutch teeth 273 from engagement with clutch teeth 280 and engage the clutch teeth 273 with the clutch teeth 269, thereby establishing a direct drive through the mechanism D. The car is now running in direct drive through both the underdrive mechanism C and mechanism D and, as aforesaid, this drive is preferably a relatively fast drive by reason of the ratio of the differential mechanism at the rear axle of the vehicle. In other words, the car will be driven in a ratio approximating that which is ordinarily termed an overdrive although the drive through the power transmission is obtained with the gears of mechanism C locked up and with a direct drive through mechanism D. This has the advantage of quiet running, less wear on the gears during normal driving conditions and many other advantages.

A still further speed ratio is readily obtainable with our power transmission and is of considerable importance especially where a fluid coupling B is employed, this speed ratio drive being obtained by a combination of the underdrive of mechanism D and direct drive in mechanism D. For example, in initially starting the vehicle, the driver may depress the pedal 98 and manipulate the gear selector element to establish direct drive in mechanism D and the car will then be initially accelerated in this speed ratio. As soon as the car reaches the desired predetermined speed, direct drive may be established through the underdrive mechanism C by momentary release of the accelerator pedal as aforesaid, which will permit engagement of the teeth 67 with the teeth 57.

In driving the vehicle in reverse from a condition of car standstill, the driver depresses pedal 98 to release clutch F and then manipulates the selector lever from neutral to reverse setting which will establish a driving relationship between the gears 285 and 286 of the mechanism D. The drive will then take place through the underdrive of the mechanism and the reduction reverse drive compounding therewith in the mechanism D. If desired, the piston 66 may be drivingly engaged with the teeth 57 to establish direct drive through the underdrive mechanism C when a sufficiently high speed has been reached by momentary release of the accelerator pedal. Ordinarily, however, the vehicle will not be driven sufficiently fast in reverse to warrant any step up in the relatively low speed reverse drive.

Whenever the car is being driven with the underdrive mechanism C locked up and with mechanism D manipulated for either low speed or direct drive, the kickdown mechanism operable by overtravel depression of the accelerator pedal 198 is always available (assuming that the dash control knob 148 is in the position illustrated in Fig. 1) so that the mechanism C may be manipulated to produce a fast shift to underdrive for passing another vehicle on the road or under other conditions.

Whenever it is desired to drive in sustained underdrive through the mechanism C, the driver pushes the dash knob 148 forwardly to operate the Bowden wire mechanism 147 for holding valve V in closed position to cut off communication between the passages 120 and 121. With the underdrive locked out, the car may be initially accelerated as before by depressing pedal 98 and manipulating transmission D for either of the desired forward speed ratio drives or for reverse drive. For speed ratio changes after the car is running normally, the speed ratios in the mechanism D may be selected as aforesaid at the will of the driver.

Inasmuch as the pump G is arranged to supply pressure fluid for operation of the master clutch F only when the motor A is operating, it can be readily seen that with the mechanism described it would be impossible to start the car by towing, due to the fact that there would be no drive transmitted from the rear wheels of the car to the motor through the underdrive mechanism C because the clutch F would, under such conditions, be disengaged. Reference is now made to Figs. 11 and 12 which show a slightly modified arrangement of the mechanism D and the valve H which will permit the car to be started by towing.

A third pump L of the gerotor type is mounted adjacent the rear end cover portion 291 of the casing 268 and is driven from the tail shaft 262 by means of the ball connection 298. The pump L has a driven rotor 296 which meshes with the driving rotor 297 and draws fluid from the sump at the bottom of the casing 268 through a passage 298' into the intake chamber of pump 299.

The pressure chamber 300 of pump L is connected through a pipe (not shown) with port 301 of valve H' which is intended to be substituted in place of the valve H when the modified arrangement of Fig. 11 is used. Valve H' is shown in Fig. 12 under conditions when the vehicle is running normally with the motor A driving the car through any of the different speed ratios described above. The pressure fluid from pump L entering valve H' through port 301, flows into the lower chamber of the valve and is vented to the sump through ports 302 and 93 the latter of which is in communication with the pressure port 301 through ports 303 and 304 and passage 305 of valve H'. Piston member 306 of the valve is urged rearwardly against the rear end of its chamber against the pressure of a coil spring 307 by pressure fluid from pump G which is entering the upper chamber of the valve through port 89'. Besides flowing outwardly through the port 92' to maintain the clutch F in driving engagement, the pressure fluid from pump G also flows downwardly through port 308 and passage 309 into the lower valve chamber where it impinges on the piston member 306 moving it rearwardly in the chamber.

When the vehicle motor is at rest, there is, of course, no pressure on at port 89' of the valve H'. Thus the spring 307 will move the piston 306 forwardly in the lower chamber thereof, establishing communication between port 301 and port 310 and closing off the vent ports 302 and 303. Port 310 opens into a chamber 311 which contains a spring pressed ball check 312. Chamber 311 in turn opens through port 313 into the upper chamber of the valve. When it is desired to start the car by towing, the gear selector member controlling the mechanism D is manipulated to establish forward drive through mechanism D which will of course cause shaft 40, carrier 53 and annulus gear 49 to be rotated as soon as the driving wheels are turned. As soon as tail shaft 262 begins to rotate, pump L will begin delivering pressure fluid to port 301 of valve H'. This pressure fluid will flow through port 310 into chamber 311 unseating the ball check 312 against the spring, and thence upwardly through port 313 into the upper chamber of the valve, thence outwardly through port 92' into the cylinder J, causing rearward movement of piston 45 and engagement of clutch F. As soon as driving engagement is established between annulus gear 49 and shaft 34, the motor A will be turned over through the intermediary of the fluid coupling B and pump G will start delivering pressure fluid through port 89' of valve H'. Pump G is designed to have a much greater capacity than pump L, therefore, as soon as motor A begins to turn over an appreciable speed, pressure from pump G flowing into valve H' through passage 89' will maintain clutch F engaged and will counteract the pressure of the pump L flowing upwardly through the chamber 311 thereby causing the bell 312 to seat closing off the flow of pressure fluid upwardly through the chamber 311. At the same time, pressure from pump G will flow through port 308 and passage 309 into the lower chamber of valve H' where it will impinge against the piston 306 causing it to move rearwardly in the chamber against the pressure of spring 307 closing off port 310 from communication with port 301 and opening vent ports 302 and 303. It is preferred to design the pumps G and L so that pump G will deliver a maximum pressure in the neighborhood of 100 lbs. per square inch, while the pump L is designed to deliver a maximum pressure of approximately 40 lbs. per square inch. The pressure delivery by the pump L will be sufficient to cause engagement of clutch F and to permit sufficient driving effort to be transmitted therethrough for starting the motor A. However, as soon as the motor A begins to turn over at an appreciable speed, the pressure delivered into the valve H' from the pump G will be sufficient to maintain clutch F in driving engagement and will cut off the pressure being delivered into the upper chamber of valve H' from pump L in the manner just described.

Referring back to Fig. 3 for the moment, it will be seen that an electric motor M is mounted on the top portion of the transmission casing by means of the shelf portion 59'. The motor M has a shaft 292 on which is mounted a pinion 293 meshing with a ring gear 294 carried by the outer annular drive element 46 of the clutch F. The motor M is the regular starting motor for the vehicle engine A and, as will be noted from Fig. 3, is drivingly connected with the crankshaft 23 through the fluid coupling B. The motor M is adapted upon energization from the vehicle battery to drive pinion 293 through the overrunning clutch commonly provided, thereby causing rotation of the clutch member F which is drivingly associated with the drive shaft 34 and the runner 28 of the fluid coupling. When starting the vehicle motor the runner 28 becomes temporarily the driving member of the fluid coupling and fluid impelled therefrom will turn the impeller 25 which is directly connected to the crankshaft 23 of engine A. By starting the vehicle engine through the fluid coupling several advantages are gained, the most important being that it permits the use of a smaller and less costly starting motor. The motor M is preferably of the high speed type and, in starting the engine A, the motor shaft 292 together with the runner 28 may immediately attain a high speed due to the inherent slippage in the fluid coupling, thereby readily overcoming the static friction of the engine without necessitating a heavy surge of current from the vehicle battery.

Fig. 13 illustrates a modified form of the invention which differs from that previously described in that a friction clutch R is used to directly connect the sun gear of the planetary train to the driven shaft 40. In Fig. 13 the sun gear 315 has a rearwardly extending portion on which is splined at 317 a drive control member 316. The drive control member has a cam 318 on the external periphery thereof which is adapted to cooperate with the overrunning rollers 319 shown more particularly in Fig. 14 to effect a locking engagement with the reaction-taking member 320. The latter member is yieldably held against rotation relative to casing 59 by means of a rubber bushing 321 interposed between a bore provided in the radially extending arm 322 and the casing mounted pin 323. A similar yieldable connection is provided at the opposite side of the casing. If desired, a coil spring connection such as that shown in Fig. 5A may be used to yieldably restrain the member 316 against reverse movement.

The member 316 is also provided with a radially outwardly extending portion 324 forming the driving member of the friction clutch R which is provided with the driving discs 325 and the driven discs 326. Driven discs 326 have a splined connection at their inner peripheral portions with a member 327 splined on the shaft 40. A cylinder 328 is also splined on the shaft 40 and encloses a piston 329 which is adapted to be moved forwardly in the cylinder against the force of a coil spring 330 to force the clutch plates 325 and 326 into driving engagement. Pressure fluid from the pump K may be introduced into the cylinder 328 through passages 331, 332 and 333 to move the piston 329 forwardly against the spring 330.

The fluid system which supplies pressure fluid to the cylinder 328 will not be described in detail inasmuch as it is identical with that used in connection with the Fig. 3 modification. If desired, the ignition grounding mechanism illustrated at the left hand portion of Fig. 8 may be eliminated. Due to the fact that the clutch R is of the friction type, no unloading of the clutch members is necessary to effect disengagement thereof.

In the operation of the Fig. 13 modification, lock-up of the underdrive will occur as soon as the pump K delivers sufficient fluid to move piston 329 forwardly against spring 330 and takes place without the necessity of any action whatsoever on the part of the driver. Because of the friction clutch R, all necessity for a blocker member is eliminated and direct drive through the mechanism C will take place automatically without it being necessary to effect a reversal of driving torque, as soon as the predetermined speed of twenty miles an hour is reached whereupon the clutch R will be engaged by the piston 329. The speed at which lock-up takes place may, of course, be varied by varying the compression of the spring 246, as described in connection with the Fig. 3 modification.

When kickdown is desired, overtravel of the accelerator pedal 198 will energize solenoid O, which will cut off the supply of pressure fluid to cylinder 328 and permit spring 330 to disengage the clutch R and vent the cylinder. Here again, no reversal of torque is required so no shorting of the vehicle ignition is necessary although no harm will be done if the ignition is grounded. The mechanism illustrated in Fig. 8 for momentarily shorting the ignition upon energization of the solenoid O may therefore be used or omitted as desired.

The dashpot P, shown in Figs. 8 and 9, is of especial significance in the operation of the Fig. 13 modification because it permits smooth and gradual engagement of the clutch R after de-energization of the solenoid O, thereby avoiding shock to the vehicle passengers and wear on the clutch parts.

The modified fluid control system for the main vehicle clutch F, illustrated in Figs. 11 and 12 and described in connection therewith, may be used with the Fig. 13 modification to provide means for starting the car by towing.

Fig. 15 illustrates a further modification of the invention. In this modification, the sun gear 340 has a rearwardly extending control portion 341 having a cam 342 on its outer surface which is adapted to cooperate with the overrunning rollers 343. A reaction-taking member 344 surrounds the portion 341 and is fixed to the casing 59 through the intermediary of a casing mounted pin 345 and a rubber bushing 346.

The control portion 341 has a further rearwardly extending portion on which are carried the clutch teeth 347 and the inclined cone surface 348. A second set of clutch teeth 349 is carried on the member 350 which is splined on the driven shaft 40 at 351. The teeth 347 and the teeth 349 are adapted to be drivingly connected by a third set of teeth 352 formed internally on the forwardly extending portion of a piston 353. The latter is splined on the shaft 40 at 355 and is adapted for forward movement against the force of a coil spring 356. A cylinder 354 surrounds the piston and has an inlet passage 357 for pressure fluid supplied from the pump K through passage 358.

A blocker member 359 is positioned between the clutch members 341 and 350. This blocker member has an internal conical surface adapted to engage the surface 348 of member 341 as shown in Fig. 15, and a rearwardly extending pin 361 which extends into a groove provided in the member 350. The member 359 also carries a set of blocker teeth 360 which are adapted to abut the teeth 352 and thus prevent forward movement of the piston member 353 under certain conditions of operation as will be hereinafter explained.

The Fig. 15 modification is designed to be used with the fluid supply system described for use with the Fig. 3 modification, shown more particularly in Figs. 8, 9 and 10, without alteration thereof.

In the operation of the Fig. 15 modification, the vehicle may be started from standstill through the underdrive mechanism C, the sun gear 340 being held against reverse rotation by the overrunning rollers 343 which are wedged into engagement with the brake or reaction-taking member 344. The vehicle may be accelerated through the underdrive until the predetermined speed is reached at which lock-up of the underdrive mechanism is designed to take place, whereupon direct drive through the transmission may be effected by momentary closure of the engine throttle which will cause a reversal of driving torque through the transmission, the shaft 40 becoming temporarily the driving member. The sun gear 340 will then tend to be driven forwardly at a speed greater than that of the annulus gear 49 and the drive control portion 341 of the sun gear will overrun the reaction-taking member 344 through the action of the rollers 343. Because of the clutching action at the friction surface 348, the member 341 will then rotate the blocker member 359 forwardly to the limit of movement permitted by the slots in member 350 engaged by the pins 361, thereby unblocking the teeth 349 and permitting forward movement of piston member 353 and meshing of the teeth 352 with teeth 347. Depression of the accelerator pedal will then cause the vehicle to be driven in direct drive through the mechanism C.

Kickdown may be obtained at any time by overtravel of the accelerator pedal 198 which will cause solenoid O (Fig. 8) to be energized to cut off the flow of pressure fluid through passages 357 and 358 into cylinder 354 and venting said cylinder to the sump 113, thereby permitting the spring 356 to move piston member 353 rearwardly, disengaging the teeth 352 from teeth 347. Direct drive may be reestablished when desired by momentarily releasing the accelerator pedal which will cause a drop in the speed of the annulus gear 49 with respect to shaft 40 and permit the control portion 341 of the sun gear to move the blocker member 359 out of blocking position with respect to the teeth 352.

In the Fig. 15 modification, the dashpot P may be omitted without materially effecting the operation of the device. It is, however, preferred to use the dashpot P in order to assure smooth and gradual reengagement of the teeth 352 and 347 after kickdown.

The modification shown in Fig. 15 also includes reverse driving means which eliminates the necessity for using the auxiliary pressure fluid supply system for the operation of the main vehicle clutch F shown in Figs. 11 and 12. This means comprises a reverse type roller clutch, the details of which are illustrated in Fig. 16. By referring to this figure in connection with Fig. 15, it will be noted that the forwardly extending portion 53 of planetary carrier 52, which is splined on the shaft 40 as indicated at 54, has a cam 363 on its outer surface which is adapted to cooperate with the overrunning rollers 364. Rollers 364 are disposed between the cam surface 363 and the inner periphery of the shoulder portion 43 of cylinder J. It will thus be seen that rollers 364 will wedge into driving position whenever shaft 40 tends to overrun shaft 34. Thus the engine may be started by towing, simply by manipulating the gears in mechanism D into one of the forward driving ratios whereupon shaft 40 will drive shaft 34 directly through the overrunning device just described.

If for any reason it is not desired to use the overrunning device between shafts 34 and 40, the auxiliary pump L together with the valve mechanism H' illustrated in Figs. 11 and 12 may be used.

It is desired to point out that the reverse overrunning device just described may be used with either of the modifications shown in Figs. 3 and 13, as well as with the Fig. 15 form if desired.

It is not desired to limit the invention, in its broader aspects, to any particular combination and arrangement of parts such as shown and described, since various modifications will be apparent from the teachings of our invention, the scope thereof being defined in the appended claims.

We claim:

1. In a motor vehicle drive having a driving structure adapted to receive drive from the vehicle engine, a driven structure adapted to drive the vehicle; gear means operably connecting said structures for driving the driven structure from and at a speed different than that of the driving structure, said gear means including a drive-reaction-taking element, and means releasably holding said drive-reaction-taking element to effect said different speed drive; a shiftable clutching member drivingly connected to one of said structures and adapted for positive clutching engagement with said drive-reaction-taking element to thereby lock said gearing means and connect said structures for direct drive therebetween; control means for said shiftable member operable to block shift of said member to thereby prevent the latter from engaging said drive-reaction-taking element when the speeds of said structures are asynchonous.

2. In a motor vehicle drive having a driving structure adapted to receive drive from the vehicle engine, a driven structure adapted to drive the vehicle; gear means operably connecting said structures for driving the driven structure from and at a speed different than that of the driving structure, said gear means including a drive-reaction-taking element, and means releasably holding said drive-reaction-taking element to effect said different speed drive; a shiftable clutching member drivingly connected to one of said structures and adapted for positive clutching engagement with said drive-reaction-taking element to thereby lock said gearing means and connect said structures for direct drive therebetween; control means for said shiftable member operable to block shift of said member to thereby prevent the latter from engaging said drive-reaction-taking element when the speeds of said structures are asynchronous; said control means comprising a blocker element, and means drivingly connecting said blocker element to said clutching-member-connected structure with clearance to accommodate limited rotation relative thereto.

3. In a motor vehicle drive having a driving structure adapted to receive drive from the vehicle engine, a driven structure adapted to drive the vehicle; gear means operably connecting said structures for driving the driven structure from and at a speed different than that of the driving structure, said gear means including a drive-reaction-taking element, and means releasably holding said drive-reaction-taking element to effect said different speed drive; a shiftable clutching member drivingly connected to one of said structures and adapted for positive clutching engagement with said drive-reaction-taking element to thereby lock said gearing means and connect said structures for direct drive therebetween; control means for said shiftable member operable to block shift of said member to thereby prevent the latter from engaging said drive-reaction-taking element when the speeds of said structures are asynchronous; and means operable in response to the attainment of a predetermined vehicle speed and synchronized rotation of said structures for engaging said shiftable clutching member with said drive-reaction-taking element.

4. In a motor vehicle power transmission having driving and driven structures and mechanism operable to drive the driven structure from the driving structure in a 1 to 1 ratio drive or in a speed ratio drive different from said 1 to 1 drive; said mechanism comprising planetary gearing having a drive-reaction-taking element, and including a drive controlling holding device adapted to hold said element against rotation to establish said different speed ratio drive; a clutching device adapted to clutch said element to said driven structure to establish said 1 to 1 drive; a source of fluid under pressure; means for controlling delivery of the pressure fluid from said source to said clutching device to effect driving engagement thereof, and a blocker member operatively associated with said clutching device for preventing said driving engagement except at substantially synchronous speeds of said element and said driven shaft.

5. In a motor vehicle power transmission having driving and driven structures and mechanism operable to drive the driven structure from the driving structure in a 1 to 1 ratio drive or in a speed ratio drive different from said 1 to 1 drive; said mechanism including a member adapted to be held stationary during operation of said different speed ratio drive and to be clutched to said driven structure during operation of said 1 to 1 ratio drive, a clutch element drivingly connected to said driven structure and adapted to be shifted into clutching engagement with said member to establish said 1 to 1 ratio drive; control means for said shiftable clutch member operable to block shift of said member when the speeds of said structures are asynchronous; said control means comprising a blocker element drivingly connected to said driven structure with clearance accommodating limited rotation relative thereto; and means operable automatically upon coast of said driving structure for rotating said blocker member through said clearance to permit shift of said shiftable clutch member.

6. In a motor vehicle drive having a driving structure adapted to receive drive from the vehicle engine, a driven structure adapted to drive the vehicle; gear means operably connecting said structures for driving the driven structure from and at a speed different than that of the driving structure, said gear means including a drive-reaction-taking element, and means releasably holding said drive-reaction-taking element to effect said different speed drive; a shiftable clutching member drivingly connected to one of said structures and adapted for positive clutching engagement with said drive-reaction-taking element to thereby lock said gearing means and connect said structures for direct drive therebetween; control means for said shiftable member operable to block shift of said member to thereby prevent the latter from engaging said drivereaction-taking element when the speeds of said structures are asynchronous; said control means comprising a blocker element drivingly connected to said clutching-member-connected structure with clearance to accommodate limited rotation relative thereto; and means operable upon coast of said driving structure relative to said driven structure to rotate said blocker member through said clearance and to synchonize the speeds of said structures to accommodate shift of said clutching member.

7. In a motor vehicle drive having a driving structure adapted to receive drive from the vehicle engine, a driven structure adapted to drive the vehicle; gear means operably connecting said structures for driving the driven structure from and at a speed different than that of the driving structure, said gear means including a drive-reaction-taking element, and means releasably holding said drive-reaction-taking element to effect said different speed drive; a shiftable clutching member drivingly connected to one of said structures and adapted for positive clutching engagement with said drive-reaction-taking element to thereby lock said gearing means and connect said structures for direct drive therebetween; control means for said shiftable member operable to block shift of said member to thereby prevent the latter from engaging said drive-reaction-taking element when the speeds of said structures are asynchronous; said control means comprising a blocker element and means drivingly connecting said blocker element to said clutching-member-connected structure with clearance to accommodate limited rotation relative thereto; an overrunning device drivingly disposed between said drive-reaction-taking element and said blocker element for permitting said blocker element to overrun said drive-reaction-taking element during said different speed drive and operable to establish a driving connection between said elements upon coast of said driving structure relative to said driven structure.

8. In a motor vehicle drive having a driving structure adapted to receive drive from the vehicle engine, a driven structure adapted to drive the vehicle; gear means operably connecting said structures for driving the driven structure from and at a speed different than that of the driving structure, said gear means including a drive-reaction-taking element, and means releasably holding said drive-reaction-taking element to effect said different speed drive; a shiftable clutching member drivingly connected to one of said structures and adapted for positive clutching engagement with said drive-reaction-taking element to thereby lock said gearing means and connect said structures for direct drive therebetween; control means for said shiftable member operable to block shift of said member to thereby prevent the latter from engaging said drive-reaction-taking element when the speeds of said structures are asynchronous; said control means comprising a blocker element, and means drivingly connecting said blocker element to said clutching-member-connected structure with clearance to accommodate limited rotation relative thereto; and means actuated by said driving structure upon coast for rotating said blocker element through said clearance to unblock said shiftable member.

9. In a motor vehicle drive having a driving structure adapted to receive drive from the vehicle engine, a driven structure adapted to drive the vehicle; gear means operably connecting said structures for driving the driven structure from and at a speed different than that of the driving structure, said gear means including a drive-reaction-taking element, and means releasably holding said drive-reaction-taking element to effect said different speed drive; a shiftable clutching member drivingly connected to one of said structures and adapted for positive clutching engagement with said drive-reaction-taking element to thereby lock said gearing means and connect said structures for direct drive therebetween; control means for said shiftable member operable to block shift of said member to thereby prevent the latter from engaging said drive-reaction-taking element when the speeds of said structures are asynchronous; said control means comprising a blocker element, and means drivingly connecting said blocker element to said clutching-member-connected structure with clearance to accommodate limited rotation relative thereto; and an overrunning device disposed between said driving structure and said blocker element for permitting overrun during said different speed drive, said device being operable to establish a drive connection between said structure and said element upon coast of said structure.

10. In combination, a pair of power transmitting members having means for positively engaging with one another; an intermediate member drivingly connected to one of said members with clearance to accommodate limited movement relative thereto and having an overrunning connection with the other of said members; said intermediate member being adapted to prevent engagement of said power transmitting members when their speeds are asynchronous and, upon movement through said clearance, to permit said engagement.

11. In combination, a pair of power transmitting members having means for positively engaging with one another; an intermediate member drivingly connected to one of said members with clearance to accommodate limited movement relative thereto and having an overrunning connection with the other of said members; said intermediate member being adapted to prevent engagement of said power transmitting members when their speeds are asynchronous and, upon movement through said clearancce, to synchronize said members and permit said engagement.

12. In combination, a pair of power transmitting members having means for positively engaging with one another; an intermediate member drivingly connected to one of said power transmitting members with clearance to accommodate limited rotation relative thereto; an overrunning device connecting said intermediate member with the other of said power transmitting members, said device accommodating overrunning of said intermediate member when said power transmitting members are disengaged; said intermediate member being adapted to prevent engagement of said power transmitting members when their speeds are asynchronous; and to be moved through said clearance by engagement of said overrunning device to permit said engagement.

13. In a power transmission for a vehicle having a motor; driving and driven members having means for positively engaging with one another; an intermediate member drivingly connected to said driven member with clearance to accommodate limited movement relative thereto and having an overrunning connection with said driving member; said intermediate member being adapted to prevent engagement of said members when their speeds are asynchronous and upon movement through said clearance to permit said engagement.

14. In a power transmission for a vehicle having a motor, driving and driven members having means for positively engaging with one another; an intermediate member drivingly connected to said driven member with clearance to accommodate limited movement relative thereto and having an overrunning connection with said driving member; said intermediate member being adapted to prevent engagement of said members when their speeds are asynchronous; and means operable upon coast of said driving member for moving said intermediate member through said clearance to permit said engagement 15. In a power transmission for a motor vehicle having an engine provided with a throttle valve; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; positively engageable clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; driver operated means for adjusting the engine throttle valve; and means operable in response to driver operation of said throttle valve adjusting means for unloading and effecting release of said clutch means thereby releasing said direct drive and causing said lesser speed drive to take place.

16. In a power transmission for a motor vehicle having an engine provided with a throttle valve; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected member whereby the driven shaft is driven from the driving shaft at said lesser speed; pressure fluid operated positively engageable clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; valving means operable to control supply of pressure fluid to said clutch means; driver operated means for adjusting the engine throttle valve; and means operable in response to driver operation of said throttle valve adjusting means for unloading said clutch and for effecting operation of said valving means to release said clutch means thereby releasing said direct drive and causing said lesser speed drive to take place.

17. In a power transmission for a motor vehicle having an engine provided with a throttle valve; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected member whereby the driven shaft is driven from the driving shaft at said lesser speed; positive clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; an accelerator pedal operable by the vehicle driver; means operably connecting said accelerator pedal with said throttle valve accommodating movement of said accelerator pedal through a throttle opening range and therebeyond for overtravelling the throttle valve while maintaining the latter in substantially fully opened position; and means operable in response to operation of said accelerator pedal for said overtravelling movement for unloading and effecting release of said clutch means thereby releasing said direct drive and causing said lesser speed drive to take place.

18. In a power transmission for a motor vehicle having an engine provided with a throttle valve; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means including positively engageable members operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; driver operated means for adjusting the engine throttle valve; means operable in response to driver operation of said throttle valve adjusting means for effecting release of said clutch means thereby releasing said direct drive and causing said lesser speed drive to take place; and means operable by the vehicle driver for effecting release of said clutch means independently of driver operation of said throttle valve adjusting means thereby rendering said direct drive inoperable and enabling sustained vehicle drive in said lesser speed.

19. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; clutch means including positively engageable members operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; electrically energized means for controlling operation of said clutch means; a vehicle driver actuated control element; and means operating in response to actuation of said control element by the vehicle driver for effecting energization of said electrically energized means to cause momentary release of drive through said transmission and release of said clutch means thereby releasing said direct drive.

20. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; one of said members being adapted for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; pressure fluid operated clutch means comprising members positively engageable with one another operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; valving means operable to control supply of pressure fluid to said clutch means; a solenoid adapted to be electrically energized for operating said valving means; a vehicle driver actuated control element; and means operating in response to actuation of said control element by the vehicle driver for effecting energization of said solenoid to cause release of drive through said transmission and disengagement of said clutch means thereby releasing said direct drive.

21. In a power transmission for a motor vehicle having an engine; a driving shaft adapted to receive drive from the engine; a driven shaft; means for driving the driven shaft from the driving shaft at a speed less than that of the driving shaft; said driving means including planet gearing, a carrier member for said planet gearing, a sun gear member meshing with said planet gearing, and an annulus gear member meshing with said planet gearing; clutch means for connecting one of said members for direct drive from the driving shaft and another of said members being adapted to directly drive the driven shaft; overrunning means for controlling the remainder of said members; said overrunning means operating to automatically prevent rotation of said remainder member in the direction of rotational tendency thereof caused by drive of said driving-shaft-connected-member whereby the driven shaft is driven from the driving shaft at said lesser speed; positively engageable clutch means operable to effect direct drive connection between one of said shafts and one of said members for causing said members to rotate as a unit with the driving and driven shafts and thereby provide a direct drive from the driving shaft to the driven shaft; said overrunning means operating to automatically release said remainder member to accommodate said direct drive; a tailshaft adapted to be driven by the driven shaft for driving the vehicle; change speed mechanism for selectively driving the tailshaft from the driven shaft in at least one forwardly driving speed ratio or in reverse; a manually shiftable selector element; means for selectively manipulating said change speed mechanism in response to shift of said selector element; and means under control of the vehicle driver for effecting release of said first clutch means to facilitate said selective manipulation of said change speed mechanism.

22. In a power transmission for driving a vehicle having an engine provided with a throttle valve; a driving structure; a driven structure; means for positively engaging said structures for direct drive therebetween; means for driving said driven structure from and at a different speed relative to said driving structure; means including a fluid pressure motor operable automatically in response to acceleration of the vehicle from rest through said different speed driving means to predetermined speed for engaging said positively engaging means during subsequent coast of said vehicle; a vehicle driver actuated throttle valve control; means operable in response to operation of said throttle valve control to approximately the limit of its travel in throttle-opening direction for unloading and disengaging said positively engaging means.

23. In a power transmission for driving a motor vehicle having a throttle and a driver actuated throttle control, a pair of power transmitting members having means for positively engaging with one another; control means for said positively engaging means operable to block engagement thereof when the speeds of said members are asynchronous; means operable upon acceleration of said vehicle from rest to predetermined speed followed by coast of the vehicle for causing said control means to unblock and permit said engagement; and means operable upon driver actuation of said throttle control to approximately the limit of its travel in throttle-opening direction for causing momentary release of drive through said transmission and for disengaging said positively engaging means.

24. In a power transmission for driving a vehicle having a motor, a drive structure adapted to receive drive from the motor; a driven structure adapted to drive the vehicle; means for driving the driven structure from the drive structure at a 1 to 1 ratio or at a speed ratio different from said 1 to 1 ratio; said means including a drive element adapted to be held stationary during said different speed ratio drive; a clutch member drivingly connected to said driven structure; a set of clutch teeth on said drive element; a set of clutch teeth on said clutch member; said sets of clutch teeth adapted for engagement upon movement of said clutch member toward said drive element to establish said 1 to 1 ratio drive, a blocker member operably associated with said drive element and adapted to prevent engagement of said clutch teeth while their speeds are asynchronous; juxtapositioned sets of blocker teeth on said blocker member and clutch member respectively so arranged that in one position of said blocker member the respective sets of teeth abut whereby meshing of said sets of clutch teeth is prevented, while in another position of said blocker member the respective sets of blocker teeth pass through one another, thereby permitting engagement of said sets of clutch teeth.

25. Power transmission mechanism comprising a casing, a planetary gearset disposed in said casing, said gearset including a driving element, a driven element and a reaction element, means for releasably clutching said reaction element to said driven element to provide direct drive through said mechanism, means automatically operable upon release of said clutching means for holding said reaction element against rotation to provide a torque multiplying drive through said mechanism, said holding means including a member fixed with respect to said casing and capable of a slight degree of universal movement with respect thereto.

26. In a planetary gear transmission for a motor vehicle having an engine, a drive shaft adapted to be driven by the engine; a driven shaft adapted to drive the vehicle; an annulus gear adapted to be driven from the drive shaft; a planet pinion meshing with said annulus gear; a carrier rotatably mounting said planet pinion and adapted to be drivingly connected with said driven shaft; a sun gear loosely journalled on said driven shaft and meshing with said planet pinion; said sun gear having an axially extending control portion; a non-rotatable drive control element surrounding said sun gear control portion; overrunning means disposed between said sun gear control portion and said element and adapted to permit said sun gear to rotate in one direction and to hold said gear against rotation in the opposite direction; and means for holding said drive control element against rotation comprising a stationary member fixed to said vehicle and a universally yieldable connection between said member and said element.

27. In a power transmission for a motor vehicle having an engine, a hollow driving shaft adapted to be driven by the engine, a fluid pressure cylinder formed in the rear end of said shaft, a clutch drive member terminally carried at the rear of said shaft, an annulus gear disposed coaxially adjacent the end of said shaft, a driven clutch member carried by said annulus gear, and means including a piston disposed in said cylinder for moving said clutch member into engagement.

28. In combination with a power transmitting element, a sleeve drivingly connected to said element; a member surrounding said sleeve; a driven member disposed within said sleeve; overrunning devices disposed between said sleeve and each of said members; said overrunning devices being arranged to lock said sleeve to said first member in one direction of rotational tendency thereof and to lock said driven member to said sleeve in the opposite direction of rotational tendency thereof.

29. In a power transmission for a motor vehicle having an engine, a hollow drive shaft adapted to be driven by the engine, said shaft terminating rearwardly of said engine in an enlarged hollow annular portion forming a fluid cylinder, a flange in said annular portion outwardly of said cylinder, a clutch member carried by said flange, an annulus gear disposed coaxially adjacent the end of said shaft, a clutch member carried by said annulus gear adapted to be engaged by the aforesaid clutch member, and a piston slidably disposed in said cylinder and adapted to control the engagement of said clutch members.

30. In a power transmission for motor vehicles having an engine, a hollow drive shaft adapted to be driven by said engine, said drive shaft terminating rearwardly of said engine in an enlarged annular portion adapted to house an annular piston, a clutch member carried by said enlarged portion, a driven shaft having a forward end portion disposed coaxially within the hollow drive shaft, an annulus gear carried by said driven shaft, a clutch member carried by said annulus gear adapted to engage the aforesaid clutch member, fluid pressure means for causing said piston to drivingly engage said clutch members, a sun gear journalled on said driven shaft within the longitudinal confines of said annulus gear, a planet gear meshing with said annulus gear and said sun gear, a carrier mounting said planet gear and having a driving connection with said driven shaft, and means for holding said sun gear against rotation in at least one direction.

31. In a power transmission for a motor vehicle having an engine, a hollow drive shaft adapted to be driven by the engine; said drive shaft having a radially enlarged rearward portion forming an annular cylinder and including a flange disposed radially outwardly of said cylinder; a piston slidably disposed in said cylinder and having a radially outwardly extending portion forming the driving spider of a clutch; an annulus gear disposed rearwardly adjacent to said cylinder; a driven clutch member operatively associated with said annulus gear and said spider; and means including a source of pressure fluid for moving said piston rearwardly in said cylinder to drivingly engage said clutch.

32. In a motor vehicle power transmission, a drive shaft adapted to receive drive from the motor of the vehicle; a driven shaft adapted to drive the vehicle; a planetary gearset drivingly disposed between said shafts; means for holding the sun gear of said gearset against rotation whereby a reduced speed drive is transmitted to said driven shaft; means for clutching said sun gear to said driven shaft whereby said driven shaft is driven at the speed of said drive shaft; means controlled by rotation of said driven shaft for engaging said clutch means; and means controlled by said sun gear for preventing engagement of said clutching means except at synchronous speed of said sun gear and said driven shaft.

33. In a motor vehicle power transmission, a drive shaft adapted to receive drive from the motor of said vehicle; a driven shaft adapted to drive the vehicle; an annulus gear driven by said drive shaft; a sun gear loosely journalled on said driven shaft; a planet gear meshed with said annulus gear and said sun gear and having a carrier drivingly connected to said driven shaft; said sun gear having a drive controlling portion associated therewith; clutch teeth formed on said drive controlling portion; a clutch member carried by said driven shaft and adapted for forward movement to engage said teeth; a blocker member carried by said driven shaft and capable of slight rotational movement relative thereto; said blocker member being normally urged into blocking position to prevent forward movement of said clutch member; an external cam on said controlling portion; a drive-reaction-taking member surrounding said controlling portion; overrunning rollers operatively disposed between said cam and said reaction-taking-member and adapted to be engaged by said cam to take the drive reaction incident to the drive of said carrier; an internal cam on said controlling portion; overrunning rollers operatively disposed between said internal cam and said blocker member and adapted to be engaged by said internal cam upon reversal of driving force through said transmission to move said blocker member to non-blocking position.

34. In a motor vehicle power transmission having a casing, a drive shaft adapted to receive drive from the vehicle motor; a driven shaft adapted to drive the vehicle; a planetary gearset having a drive element adapted to be driven by said drive shaft; a driven element drivingly connected to said driven shaft, and a drive-reaction-taking-element loosely journalled on said driven shaft and having a drive controlling sleeve extending axially therefrom, a member surrounding said sleeve, means operable to lock said sleeve to said member against reverse rotation relative to said other planetary elements, a pin fixed to said casing, an arm extending radially from said member having a hole therein adapted to loosely receive said pin, and yieldable material filling the space between said pin and said arm.

35. In a motor vehicle power transmission having a casing, a drive shaft adapted to receive drive from the vehicle motor; a driven shaft adapted to drive the vehicle; a planetary gearset having a drive element adapted to be driven by said drive shaft; a driven element drivingly connected to said driven shaft, and a drive-reaction-taking element loosely journalled on said driven shaft and having a drive controlling sleeve extending axially therefrom, a reaction-taking-member surrounding said sleeve and fixed to said casing, an overrunning roller disposed between said sleeve and said member and adapted to be wedged into locking engagement with said sleeve and member; a second member splined on said driven shaft within said sleeve, an overrunning roller disposed between said sleeve and said second member and adapted to be wedged into locking engagement with said sleeve and second member, and a carrier mounting both of said rollers and operable to maintain one of said rollers in non-engaged position during engagement of the other of said rollers.

36. In a motor vehicle power transmission having a casing, a drive shaft adapted to receive drive from the vehicle motor; a driven shaft adapted to drive the vehicle; a planetary gearset having a drive element adapted to be driven by said drive shaft; a driven element drivingly connected to said driven shaft, and a drive-reaction-taking-element loosely journalled on said driven shaft; means for locking said reaction element against reverse rotation relative to said other elements to establish a torque varying drive between said shafts; a drive controlling sleeve extending axially from said reaction element, a clutch element carried by said driven shaft and adapted for movement to engage said sleeve, a blocker member carried by said driven shaft within said sleeve, yieldable means for retaining said blocker member in such position relative to said clutch element that driving engagement thereof is prevented, an overrunning device between said sleeve and said blocker member, said device being adapted to permit said blocker member to overrun said sleeve during operation of said torque multiplying drive and being operable to establish a driving connection between said sleeve and blocker member upon reversal of driving torque through said transmission, caused by a slowing down of the vehicle motor relative to said driven shaft, to move said blocker member to non-blocking position.

37. In a power transmission, a drive shaft; a driven shaft adapted to receive drive from said drive shaft: a reaction element adapted to be held against rotation to establish a torque multiplying drive between said shafts and to be drivingly connected to said driven shaft to establish direct drive between said shafts; a drive control sleeve operatively associated with said reaction element; overrunning cams formed on the outer and inner cylindrical surfaces respectively of said sleeve; rollers disposed in contact with said cams and adapted to cooperate with said cams to lock said reaction element against movement in one direction of movement and to drivingly connect said reaction element to said driven shaft in the other direction of movement.

38. In a power transmission, a drive shaft; a driven shaft adapted to receive drive from said drive shaft; a rotatable drive-reaction-taking-element; a brake element; a drive control sleeve operatively associated with said reaction element; a cam element formed on the inner surface of said sleeve; a cam formed on the outer surface of said sleeve; an overrunning roller associated with said outer cam and adapted to be wedged into engagement with said cam and brake element; an overrunning roller associated with said inner cam and adapted to be wedged into driving position to establish a drive between said sleeve and said driven shaft; a carrier for each of said rollers, and means interconnecting said carriers.

39. In a power transmission, a drive shaft; a driven shaft adapted to be driven from said drive shaft at a 1 to 1 speed ratio with respect thereto or at a speed ratio different from said 1 to 1 ratio; a driving element adapted to be held stationary during said different speed ratio drive and to be clutched to said driven shaft to establish said 1 to 1 ratio drive; a clutch member adapted for movement to engage said element; a set of teeth on said element; a set of teeth on said clutch member; a blocker member operably associated with said driving element; a second set of teeth on said clutch member; a set of teeth on said blocker member disposed in juxtaposed relation with respect to said second set of teeth; means for yieldably holding said blocker member in such position that the blocker teeth abut said second set of teeth and thereby prevent engagement of said clutch member with said driving element; and means operable upon reversal of driving torque through the transmission for moving said blocker member out of blocking position.

40. In a motor vehicle drive having a driving structure adapted to receive drive from the vehicle engine, a driven structure adapted to drive the vehicle; means operably connecting said structures for driving the driven structure from the driving structure including a clutch; a fluid actuated motor for controlling said clutch, a pump driven by said engine for supplying fluid to said motor; and an overrunning device having a driving element drivingly connected to said driven structure and a driven element drivingly connected to said engine.

41. In a motor vehicle power transmission, a drive shaft adapted to receive drive from the motor of said vehicle; a shaft adapted for connection to the wheels of said vehicle; a clutch for drivingly connecting said motor and said drive shaft; a fluid actuated motor for controlling said clutch; a source of fluid pressure actuated by said vehicle motor; a second source of fluid pressure actuated by said wheel connected shaft; fluid conducting passages between said fluid motor and each of said pressure fluid sources; a valve for controlling the flow of pressure fluid from said sources to said motor, said valve being so constructed and arranged that said fluid motor is connected with both of said pressure fluid sources when said vehicle motor is stationary; and means associated with said valve for actuating the same to cut off the flow of fluid from said second source upon rotation of said motor.

42. In a motor vehicle power transmission, a drive shaft adapted to receive drive from the motor of said vehicle; a shaft adapted for connection to the wheels of said vehicle; a clutch for drivingly connecting said motor and said drive shaft; a fluid actuated motor for controlling said clutch; a source of fluid pressure actuated by said vehicle motor; a second source of fluid pressure actuated by said wheel connected shaft; fluid conducting passages between said fluid motor and each of said pressure fluid sources; a valve for controlling the flow of pressure fluid from said sources to said motor, said valve being so constructed and arranged that said fluid motor is connected with both of said pressure fluid sources when said vehicle motor is stationary; and means associated with said valve and operable by pressure fluid from said vehicle motor actuated source for actuating the same to cut off flow of fluid from said second source upon rotation of said motor.

43. In a motor vehicle power transmission, a drive shaft adapted to receive drive from the motor of said vehicle; a shaft adapted for connection to the wheels of said vehicle; a clutch for drivingly connecting said motor and said drive shaft; a fluid actuated motor for controlling said clutch; a source of fluid pressure actuated by said vehicle motor; a second source of fluid pressure actuated by said wheel connected shaft; fluid conducting passages between said fluid motor and each of said pressure fluid sources; a valve for controlling the flow of pressure fluid from said sources to said motor, said valve being so constructed and arranged that said fluid motor is connected with both of said pressure fluid sources when said vehicle motor is stationary; driver controlled means for interrupting said connection; and means associated with said valve for actuating the same to cut off flow of fluid from said second source upon rotation of said motor.

44. In a motor vehicle power transmission, a drive shaft adapted to receive drive from the motor of said vehicle; a second shaft adapted for connection to the driving wheels of said vehicle, a clutch for drivingly connecting said motor and said drive shaft, a fluid actuated motor for controlling said clutch, a source of pressure fluid actuated by said vehicle motor, a second source of pressure fluid actuated by said second shaft, valve means interconnecting said fluid actuated motor and said sources of pressure fluid, and control means operably associated with said valve means, said control means being automatically operable to cut off communication between said fluid motor and said second source of pressure fluid whenever said first source is delivering fluid at sufficient pressure to maintain said clutch in driving engagement.

45. In a motor vehicle drive, co-acting relatively rotatable coaxial power transmitting structures, one having clutch teeth positively driven therewith; two sets of teeth driven from the other of said structures and rotatably connected together with clearance to accommodate their limited relative rotation between two predetermined positions one of which is a blocking position for blocking clutching engagement of said clutch teeth with one of said sets of teeth; said clutch teeth being shiftable relatively to said other sets of teeth to engage one of the sets thereof under blocking control of the other of the sets thereof; means comprising a connection between one of said structures and one of said sets of teeth operable to relatively rotate said sets of teeth between said predetermined positions when one of said structures tends to drop below the speed of the other; the blocking teeth being so constructed and arranged in relationship with the shiftable teeth as to unblock said shiftable teeth when one of said structures coasts down into synchronism with the other of said structures while maintaining the shiftable teeth blocked when this said one structure speeds up above the speed of said other structure.

46. In a motor vehicle drive, driving and driven structures; clutch teeth positively drivingly connected with said driven structure; blocker teeth carried by said driven structure; clutch teeth carried by said driving structure; means operatively associated with said blocker teeth for accommodating limited rotation of said blocker teeth relative to both of said sets of clutch teeth; said driven clutch teeth being shiftable relatively to said driving clutch teeth for engagement therewith under blocking control of said blocker teeth; means comprising a yieldable connection between said driven structure and said blocker teeth operable to maintain said blocker teeth in blocking position relatively to said shiftable teeth whenever the speed of said driving structure exceeds the speed of said driven structure; and means comprising an overrunning connection between said driving structure and said blocking set of teeth operable to rotate said blocker teeth to unblocking position relatively to said shiftable teeth when said driving structure coasts down to approximately the speed of said driven structure.

47. The combination set forth in claim 46 wherein the connection between said blocking set of teeth and said driven structure has clearance to accommodate limited relative rotation therebetween.

48. The combination set forth in claim 46 wherein the connection between said blocking set of teeth and said driving structure comprises a one-way clutch operable to permit overrun of said driving structure relatively to said blocking set of teeth during rotation of said driving structure at a speed in excess of the speed of said driven structure.

49. The combination set forth in claim 46 wherein the connection between said blocking set of teeth and said driving structure comprises a one-way clutch operable to permit overrun of said driving structure relatively to said blocking set of teeth during rotation of said driving structure at a speed in excess of the speed of said driven structure; said one-way clutch operating to establish a positive drive between said driving structure and said blocking set of teeth upon said driving structure dropping to the speed of said driven structure during coast thereby to rotate said blocking set of teeth into unblocking position.

50. The combination set forth in claim 46 wherein the connection between said blocking set of teeth and said driven structure includes a spring for constantly urging said blocking teeth into blocking position.

51. In a planetary gear transmission for a motor vehicle having a forwardly driving engine, a casing for said transmission; a forwardly rotatable driving shaft adapted to receive forward drive from the engine; a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and a carrier member therefor, a sun gear member meshing with said planet gear and an annulus gear member meshing with said planet gear, said annulus gear member being adapted to receive forward drive from the driving shaft and said carrier member being adapted to transmit forward drive to the driven shaft; overrunning control means for controlling the rotation of said sun gear member including a reaction-taking member resiliently carried by said casing and an overrunning roller operatively disposed between said sun gear member and said reaction-taking member; said control means operating to automatically prevent backward rotation of said sun gear member thereby to provide reaction for said reduction drive while permitting said sun gear member to rotate forwardly; positively engageable clutching structures respectively driven with said carrier member and one of said gear members and adapted when clutched together to establish a direct drive relationship between said annulus gear member and the driven shaft and causing all the aforesaid members to rotate forwardly as a locked gear train; means for shifting one of said clutching structures relative to and toward the other for clutching therewith and blocker means engageable with said shiftable clutching structure and operating to prevent shift thereof to engage the other of said clutching structures when said clutching structures are rotating asynchronously.

52. In a planetary gear transmission for a motor vehicle having a forwardly driving engine, a casing for said transmission; a forwardly rotatable driving shaft adapted to receive forward drive from the engine; a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and a carrier member therefor, a sun gear member meshing with said planet gear and an annulus gear member meshing with said planet gear, said annulus gear member being adapted to receive forward drive from the driving shaft and said carrier member being adapted to transmit forward drive to the driven shaft; overrunning control means for controlling the rotation of said sun gear member including a reaction-taking member carried by said casing and an overrunning roller operatively disposed between said sun gear member and said reaction-taking member; positively engageable clutching structures respectively driven with said carrier member and one of said gear members and adapted when clutched together to establish a direct drive relationship between said annulus gear member and the driven shaft and causing all the aforesaid members to rotate forwardly as a locked gear train; means for shifting one of said clutching structures relative to and toward the other for clutching therewith; blocker means engageable with said shiftable clutching structure and operating to prevent shift thereof to engage the other of said clutching structures when said clutching structures are rotating asynchronously; said control means being operable upon disengagement of said clutching structures to automatically prevent backward rotation of said sun gear member thereby to provide reaction for said reduction drive; and a yieldable connection between said reaction-taking member and said casing for absorbing and cushioning the shock incident to reversal of the rotational tendency of said sun gear upon disengagement of said clutching members.

53. In a planetary gear transmission for a motor vehicle having a forwardly driving engine, a casing for said transmission; a forwardly rotatable driving shaft adapted to receive forward drive from the engine, a forwardly rotatable driven shaft adapted to receive forward drive from the driving shaft for driving the vehicle forwardly; reduction drive means for driving the driven shaft forwardly from the driving shaft at a speed less than that of the driving shaft; said driving means including a planet gear and a carrier member therefor, a sun gear member meshing with said planet gear and an annulus gear member meshing with said planet gear, said annulus gear member being adapted to receive forward drive from the driving shaft and said carrier member being adapted to transmit forward drive to the driven shaft; overrunning control means for controlling the rotation of said sun gear member including a reaction-taking member yieldably carried by said casing for limited rotation relative thereto in backward direction, and an overrunning roller operatively disposed between said sun gear member and said reaction-taking member; said control means operating to automatically prevent backward rotation of said sun gear member thereby to provide reaction for said reduction drive while permitting said sun gear member to rotate forwardly; positively engageable clutching structures respectively driven with said carrier member and one of said gear members and adapted when clutched together to establish a direct drive relationship between said annulus gear member and the driven shaft and causing all the aforesaid members to rotate forwardly as a locked gear train; means for shifting one of said clutching structures relative to and toward the other for clutching therewith and blocker means engageable with said shiftable clutching structure and operating to prevent shift thereof to engage the other of said clutching structures when said clutching structures are rotating asynchronously.

54. In a motor vehicle power transmission having driving and driven structures, means for driving the driven structure from the driving structure at 1 to 1 ratio with respect thereto or at a speed ratio different from 1 to 1 including a planetary carrier connected to the driven structure; planet pinions carried by said carrier; a driving gear connected to the driving structure and disposed in mesh with said pinions; a reaction gear disposed in mesh with said pinions; means for preventing reverse rotation of said reaction gear thereby to effect said different speed ratio drive, said means being operable to permit forward rotation of said gear in response to tendency of the driven structure to drive the driving structure; a clutch member carried by the driven structure and adapted for shifting into engagement with said reaction gear thereby to effect said 1 to 1 ratio drive; a blocker member carried by the driven structure and adapted for limited rotation relatively thereto, said blocker member being so disposed with respect to said clutch member that it blocks shift of said clutch member; means for yieldably retaining said blocker member in the aforesaid blocking position; and means operable in response to acceleration of said reaction gear from rest to the speed of said driven structure for rotating said blocker member out of said blocking position.

55. In a power transmission having driving and driven shafts, means for driving the driven shaft from the driving shaft at the same speed thereof and at a different speed relatively thereto; said means including a pair of clutch members, one of which is adapted to remain stationary during said different speed drive and to be clutched to the other clutch member during said same speed drive; means operable in response to tendency of the driven shaft to drive the driving shaft for accelerating said stationary clutch member to the speed of the driven shaft.

56. In a power transmission having driving and driven shafts, means for driving the driven shaft from the driving shaft at the same speed thereof and at a different speed relatively thereto; said means including a pair of clutch members, one of which is adapted to remain stationary during said different speed drive and to be clutched to the other clutch member during said same speed drive; means operable in response to tendency of the driven shaft to drive the driving shaft for accelerating said stationary clutch member to the speed of the driven shaft; and an intermediate member operably associated with said clutch members for preventing their engagement when their speeds are asynchronous.

57. In a motor vehicle having a rotatable driving shaft adapted to be driven from the vehicle engine and a rotatable driven shaft adapted to drive the vehicle, an intermediate driving member disposed between said shafts; a first clutch member adapted to directly connect the driving shaft with the intermediate driving member; a second clutch member adapted to directly connect the driven shaft with the intermediate driving member; reduction drive means including an overrunning clutch interposed therein for drivingly connecting the driving shaft with the intermediate driving member whereby the latter is driven at a speed slower than the driving shaft, said overrunning clutch automatically releasing the reduction drive in response to tendency of the intermediate driving member to overrun the driving shaft; means for shifting said first clutch member to direct drive position; and blocker means operably associated with said first clutch member for blocking said shift during asynchronous rotation of said driving shaft and said intermediate driving member.

58. In a motor vehicle having a rotatable driving shaft adapted to be driven from the vehicle engine and a rotatable driven shaft adapted to drive the vehicle, an intermediate driving member disposed between said shafts, a first shiftable clutch member adapted for power operation to directly connect the driving shaft with the intermediate driving member, a second shiftable clutch member adapted for manual operation to directly connect the driven shaft with the intermediate driving member, reduction drive means including an overrunning clutch interposed therein for drivingly connecting the driving shaft with the intermediate drive member whereby the latter is driven at a speed slower than the driving shaft, said overrunning clutch automatically releasing the reduction drive in response to tendency of the intermediate driving member to overrun the driving shaft; means for shifting said first clutch member to direct drive position; and blocker means operably associated with said first clutch member for blocking said shift during asynchronous rotation of said driving shaft and said intermediate driving member.

59. The combination set forth in claim 57 including reduction drive means operatively associated with said second clutch member whereby the driven shaft may be driven from the intermediate driving member directly thereby or at a reduced speed with respect thereto.

CARL A. NERACHER.
WILLIAM T. DUNN.